(12) United States Patent
Yin et al.

(10) Patent No.: US 12,088,471 B2
(45) Date of Patent: Sep. 10, 2024

(54) METHOD AND APPARATUS FOR DETERMINING PORT ORIENTATION

(71) Applicant: HUAWEI TECHNOLOGIES CO., LTD., Guangdong (CN)

(72) Inventors: Chao Yin, Nanjing (CN); Yongxian Chen, Nanjing (CN); Heyang Liu, Nanjing (CN); Xiang Yu, Nanjing (CN); Hewen Zheng, Nanjing (CN); Liyang Sun, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 351 days.

(21) Appl. No.: 17/534,408

(22) Filed: Nov. 23, 2021

(65) Prior Publication Data

US 2022/0086051 A1    Mar. 17, 2022

Related U.S. Application Data

(63) Continuation of application No. PCT/CN2020/092209, filed on May 26, 2020.

(30) Foreign Application Priority Data

May 31, 2019    (CN) .......................... 201910470325.9

(51) Int. Cl.
*H04L 12/24*    (2006.01)
*H04L 41/12*    (2022.01)
*H04L 45/02*    (2022.01)

(52) U.S. Cl.
CPC .............. *H04L 41/12* (2013.01); *H04L 45/02* (2013.01)

(58) Field of Classification Search
CPC ..... H04L 41/0895; H04L 45/68; H04L 41/40; H04L 47/12; H04L 45/42; H04L 45/50;
(Continued)

(56) References Cited

U.S. PATENT DOCUMENTS 8,005,013 B2 *  8/2011  Teisberg ................. H04L 41/12
                                              370/254
9,014,201 B2 *  4/2015  Bogdanski .............. H04L 45/48
                                              370/408
(Continued)

FOREIGN PATENT DOCUMENTS

CN         101043422 A      9/2007
CN         101262412 A      9/2008
(Continued)

OTHER PUBLICATIONS

King Chung-Ta et al: Designing Deadlock-Free Turn-Restricted RoutingAlgorithms for Irregular Wormhole-routed Networks, Journal of Information Science and Engineering 17, 575-594 (2001), Jan. 1, 2011, XP055916573, 20 pages.
(Continued)

*Primary Examiner* — Jung Liu
(74) *Attorney, Agent, or Firm* — HUAWEI TECHNOLOGIES CO., LTD.

(57) ABSTRACT

This application provides a method and an apparatus for determining a port orientation. The method includes: A first network device receives, through a first port, a protocol data unit PDU sent by a second network device. The first network device determines, based on the PDU, that the first port is an upstream port or a downstream port. In this embodiment of this application, the first network device may determine, based on the PDU sent by the second network device, whether the first port is the upstream port or the downstream port, to provide a basis for subsequently helping an SDN controller reduce load.

20 Claims, 8 Drawing Sheets

(58) Field of Classification Search
CPC ............ H04L 41/0806; H04L 41/0893; H04L 41/0654; H04L 41/0894; H04L 41/12; H04L 12/4641; H04L 41/0213; Y02D 30/00

See application file for complete search history.

(56) References Cited

U.S. PATENT DOCUMENTS

| | | | | |
|---|---|---|---|---|
| 9,100,285 | B1* | 8/2015 | Choudhury | H04L 45/42 |
| 9,294,385 | B2* | 3/2016 | Gusat | H04L 45/48 |
| 9,596,169 | B2* | 3/2017 | Choudhury | H04L 45/02 |
| 9,979,595 | B2* | 5/2018 | Choudhury | H04L 41/0806 |
| 10,361,948 | B2* | 7/2019 | Ballard | H04L 45/48 |
| 2008/0310421 | A1* | 12/2008 | Teisberg | H04L 12/4641 370/395.53 |
| 2015/0207677 | A1* | 7/2015 | Choudhury | H04L 41/0895 370/254 |
| 2018/0254985 | A1* | 9/2018 | Ballard | H04L 45/583 |

FOREIGN PATENT DOCUMENTS

| | | |
|---|---|---|
| CN | 102377679 A | 3/2012 |
| CN | 104980302 B | 6/2018 |
| CN | 108989069 A | 12/2018 |
| CN | 109039788 A | 12/2018 |
| EP | 3413479 A1 | 12/2018 |
| WO | 2012171378 A1 | 12/2012 |

OTHER PUBLICATIONS

Liang Guo et al,IEEE 802 Nendica Report: Intelligent Lossless Data Center Networks,IEEE SA Industry connections , 2020, XP068170617, 39 pages.

P802.1 Qcz/D1.0, Draft Standard forLocal and metropolitan area networks Bridges and Bridged NetworksAmendment:Congestion Isolation, LAN/MAN Standards Committee of the IEEE Computer Society,Apr. 15, 2020, XP68166508A , 218 pages.

Request for Comments: 2863, K. McCloghrie et al, The Interfaces Group MIB, Jun. 2000, total 69 pages.

* cited by examiner

METHOD AND APPARATUS FOR DETERMINING PORT ORIENTATION

CROSS-REFERENCE TO RELATED APPLICATIONS

This application is a continuation of International Application No. PCT/CN2020/092209, filed on May 26, 2020, which claims priority to Chinese Patent Application No. 201910470325.9, filed on May 31, 2019. The disclosures of the aforementioned applications are hereby incorporated by reference in their entireties.

TECHNICAL FIELD

This application relates to the field of information technologies, and more specifically, to a method and an apparatus for determining a port orientation.

BACKGROUND

A software-defined network (SDN) is a network virtualization implementation, and is designed to separate a control plane and a data plane of a network device. This implements flexible control of data flows, and makes the network more intelligent as a pipe. The software-defined network serves as a good platform for innovation of a core network and application.

Currently, the SDN technology is widely used in a data center network, and an SDN controller manages switches in the data center network. For example, the SDN controller obtains a network topology of the data center network, generates, based on the network topology, a flow control policy for a status of a data flow transmitted in the data center network, and sends the flow control policy to a network device. The network device controls the data flow based on the flow control policy In other words, the SDN controller needs to obtain a configuration status of the data center network, for example, the network topology of the data center network and a port orientation of the network device. However, the network device does not need to know the configuration status of the data center network, and only needs to transmit the data flow based on an indication of the SDN controller.

As a scale of the data center network continues to expand, load of the SDN controller increases. This affects performance of the data center network. To reduce the load of the SDN controller, it is expected that a function originally implemented by the SDN controller can be autonomously implemented by the network device. However, because the network device cannot learn the foregoing configuration status currently, the network device cannot help the SDN controller reduce the load.

SUMMARY

This application provides a method and an apparatus for determining a port orientation, so that a network device can learn of a port orientation of a port of the network device. This provides a basis for subsequently helping an SDN controller reduce load.

According to a first aspect, a method for determining a port orientation is provided. The method includes: A first network device receives, through a first port, a protocol data unit PDU sent by a second network device. The first network device determines, based on the PDU, that the first port is an upstream port or a downstream port.

In this embodiment of this application, the first network device may determine, based on the PDU sent by the second network device, whether the first port is the upstream port or the downstream port, to provide a basis for subsequently helping an SDN controller reduce load. This avoids a problem that in the conventional technology, a network device cannot learn of the foregoing configuration, and therefore cannot help the SDN controller reduce the load.

In a possible implementation, the PDU carries a topology level of the second network device in a network; and/or the PDU carries a port orientation of a second port used by the second network device to send the PDU, where the port orientation of the second port includes that the second port is an upstream port or the second port is a downstream port.

In this embodiment of this application, the PDU carries the at least one piece of information of the topology level of the second network device and the port orientation of the second port. This is clearer for the first network device to determine whether the first port is the upstream port or the downstream port.

In a possible implementation, that the first network device determines, based on the PDU, that the first port is an upstream port or a downstream port includes: The first network device determines a topology level of the first network device in the network based on the PDU. The first network device determines, based on the topology level of the first network device, that the first port is the upstream port or the downstream port.

In this embodiment of this application, the first network device determines, based on the topology level of the first network device, whether the first port is the upstream port or the downstream port. This improves accuracy of determining a port orientation of the first port.

In a possible implementation, the network includes a plurality of network devices, and the plurality of network devices include the second network device. That a first network device receives, through a first port, a protocol data unit PDU sent by a second network device includes: The first network device receives, through a plurality of ports, a plurality of PDUs sent by the plurality of network devices, where the plurality of ports include the first port, and the plurality of PDUs include the PDU sent by the second network device. That the first network device determines a topology level of the first network device in the network based on the PDU includes: The first network device determines topology levels of the plurality of network devices in the network based on the plurality of PDUs. The first network device selects a target topology level from the topology levels of the plurality of network devices. The first network device determines the topology level of the first network device based on the target topology level and a preset rule.

In this embodiment of this application, the first network device determines the target topology level based on the topology levels of the plurality of network devices, and then determines the topology level of the first network device based on the target topology level and the preset rule, so that the first network device can determine the topology level of the first network device based on the topology levels of the plurality of network devices. This improves reliability of determining the topology level of the first network device.

Optionally, the plurality of network devices are network devices directly connected to the first network device. In other words, a layer at which the plurality of network devices are located in the network is adjacent to a layer at which the first network device is located.

It should be noted that, the plurality of network devices may be located at one layer or a plurality of layers. When the plurality of network devices are located at one layer, the plurality of network devices are located at a same layer, and the layer is adjacent to the layer of the first network device. When the plurality of network devices are located at a plurality of layers, at least two network devices in the plurality of network devices are located at different layers, and the plurality of layers are adjacent to the layer of the first network device. For example, the plurality of layers may include a layer north of the layer at which the first network device is located in the network, and a layer south of the layer at which the first network device is located.

Optionally, the plurality of network devices may alternatively be network devices not adjacent to the first network device. For example, the plurality of network devices are root nodes, and the layer of the first network device is separated from the layer of the plurality of network devices by one or more layers. In this case, the plurality of network devices may send topology levels of the root nodes to the first network device by using the plurality of PDUs. A quantity of network devices passed by each of the plurality of PDUs when the PDU is transmitted to the first network device, namely, a hop count required for transmitting the PDU to the first network device may be recorded in the PDU. The first network device may determine the topology level of the first network device based on the PDUs and the hop counts.

Optionally, the preset rule may be: adding a preset value, for example, 1, based on the target topology level. The preset rule may alternatively be: reducing a preset value, for example, 1, based on the target topology level. The preset rule may alternatively be represented by using a non-linear function.

In a possible implementation, that the first network device determines, based on the topology level of the first network device, that the first port is the upstream port or the downstream port includes: The first network device determines, based on the topology level of the first network device and the topology level of the second network device, that the first port is the upstream port or the downstream port.

In this embodiment of this application, the first network device determines, based on the topology level of the first network device and the topology level of the second network device, whether the first port is the upstream port or the downstream port. This improves reliability of determining a port orientation of the first port.

In a possible implementation, that the first network device determines, based on the PDU, that the first port is an upstream port or a downstream port includes: The first network device determines the topology level of the second network device based on the PDU. The first network device determines, based on the topology level of the second network device, that the first port is the upstream port or the downstream port.

In this embodiment of this application, the first network device may directly determine, based on the topology level of the second network device, whether the first port is the upstream port or the downstream port. This simplifies a process of determining whether the first port is the upstream port or the downstream port.

In a possible implementation, the second network device is a root node in the network. That a first network device receives, through a first port, a PDU sent by a second network device includes: The first network device receives, through the first port, the PDU sent by the second network device, where the topology level of the second network device carried in the PDU is a preset value. That the first network device determines, based on the topology level of the second network device, that the first port is the upstream port or the downstream port includes: The first network device determines, based on the preset value, that the first port is the upstream port.

In this embodiment of this application, if the second network device is the root node, the topology level of the second network device is the preset value. In this way, when determining, by using the PDU, that the topology level of the second network device is the preset value, the first network device may directly determine that the second network device is the root node.

Correspondingly, the first port that communicates with the second network device is the upstream port. This simplifies a process of determining whether the first port is the upstream port or the downstream port.

In a possible implementation, the method further includes: The first network device determines a topology level of the first network device based on the preset value. In the network, a layer represented by the topology level of the first network device is adjacent to a layer at which the root node is located.

In this embodiment of this application, if the second network device is the root node, the topology level of the second network device is the preset value. In this way, when determining, by using the PDU, that the topology level of the second network device is the preset value, the first network device may directly determine that the layer at which the first network device is located is adjacent to the layer of the root node (namely, the second network device). This simplifies a process of determining the layer of the first network device in the network.

In a possible implementation, that the first network device determines, based on the PDU, that the first port is an upstream port or a downstream port includes: The first network device determines, based on the PDU, that the second network device is a server, where the PDU carries a first TLV, and the first TLV indicates that the second network device is the server. The first network device determines that the first port is the downstream port.

In this embodiment of this application, the first TLV is carried in the PDU, to indicate that the second network device is the server. In this way, when determining, by using the PDU, that the second network device is the server, the first network device may directly determine that the first port that communicates with the second network device is the downstream port. This simplifies a process of determining a port orientation of the first port.

Optionally, the first TLV may occupy an optional TLV in the PDU, or occupy a reserved TLV in the PDU.

Optionally, the PDU is a link layer discovery protocol LLDP PDU.

In a possible implementation, that the first network device determines, based on the PDU, that the first port is an upstream port or a downstream port includes: The first network device determines, based on a port ID subtype in the LLDP PDU, that the second network device is the server. The first network device determines that the first port is the downstream port.

In this embodiment of this application, according to a rule, specified in the LLDP, that a port ID subtype used by a switch is different from a port ID subtype used by a server, the second network device may be determined as the server by using the subtype of the port ID carried in the LLDP PDU. In this way, the first port that communicates with the second network device is the downstream port. This simplifies a process of determining the port orientation of the first port.

In a possible implementation, the method further includes: The first network device determines a topology level of the first network device based on the subtype of the port ID in the LLDP PDU. In the network, a layer represented by the topology level of the first network device is adjacent to a layer at which the server is located.

In this embodiment of this application, according to a rule, specified in the LLDP protocol, that a port ID subtype used by a switch is different from a port ID subtype used by a server, the second network device may be determined as the server by using the subtype of the port ID carried in the LLDP PDU. In this way, the layer of the first network device in the network is adjacent to the server. This simplifies a process of determining the layer of the first network device in the network.

In a possible implementation, before the first network device receives the protocol data unit PDU sent by the second network device, the method further includes: The first network device sends an LLDP request to the second network device, where the LLDP request is used to request the port orientation of the second port of the second network device and/or the topology level of the second network device in the network.

In this embodiment of this application, the first network device sends the LLDP request to the second network device, to trigger the second network device to feed back an LLDP PDU to the first network device. The first network device requests, in an active request manner, the port orientation of the second port and/or the topology level of the second network device in the network. This improves flexibility of obtaining the foregoing information by the first network device.

In a possible implementation, that the first network device sends an LLDP request to the second network device the sending includes: If the port orientation of the first port is unknown, the first network device sends the LLDP request to the second network device.

In this embodiment of this application, when the port orientation of the first port is unknown, the first network device sends the LLDP request to the second network device, to trigger the second network device to feed back the LLDP PDU to the first network device. In other words, the first network device sends the LLDP request to the second network device only when the first network device needs to determine a port orientation of a port. This reduces transmission resources occupied by communication between the first network device and the second network device.

In a possible implementation, the LLDP PDU includes a second TLV, where the second TLV is used to indicate the topology level of the second network device; and/or the LLDP PDU includes a third TLV, where the third TLV is used to indicate the port orientation of the second port.

In this embodiment of this application, the topology level of the second network device and/or the port orientation of the second port may be carried in the LLDP PDU in a TLV format. In other words, an encapsulation format of a conventional LLDP PDU is used to carry the foregoing information. This avoids that network devices provided by vendors need to be compatible with a new mechanism, to support the method for determining a port orientation of a port provided in this application, and reduces changes made by the network devices provided by the vendors to be compatible with the method provided in this application.

Optionally, the second TLV or the third TLV may occupy an optional TLV in the LLDP PDU, for example, a system capability TLV, to reduce changes to the encapsulation format of the conventional LLDP PDU.

Optionally, the second TLV or the third TLV may occupy a reserved TLV in the LLDP PDU, to reduce changes to an available TLV in the conventional LLDP PDU.

In a possible implementation, the first network device includes a plurality of sending queues, the plurality of sending queues include a first sending queue and a second sending queue, and the first sending queue is an original sending queue corresponding to a first data flow. The method further includes: The first network device determines that the first port and a third port of the first network device are upstream ports. The first network device generates a priority flow control PFC deadlock prevention rule, where the PFC deadlock prevention rule is used to indicate to buffer the first data flow to the second sending queue, an ingress port of the first data flow is the first port, and an egress port of the first data flow is the third port.

In this embodiment of this application, the first network device may learn that the first port and the third port are upstream ports, and generate the PFC deadlock prevention rule for the first port and the third port, to prevent the first data flow input through the first port and output through the third port from forming a PFC deadlock with another data flow in the network. This avoids that in a deployment manner of a conventional PFC deadlock prevention rule, an SDN controller needs to generate the PFC deadlock prevention rule for the first port and the third port, and finally deploys the PFC deadlock prevention rule to the first network device. This reduces load of the SDN controller in deploying the PFC deadlock prevention rule.

In a possible implementation, the method further includes: The first network device determines a quantity of times that the first port and the third port are ports associated in a PFC deadlock within a preset time period. That the first network device generates a PFC deadlock prevention rule includes: When the quantity of times is greater than a preset threshold, the first network device determines to generate the PFC deadlock prevention rule.

In this embodiment of this application, the first network device generates the PFC deadlock prevention rule for the first port and the third port only when the quantity of times is greater than the preset threshold within the preset time period. This reduces storage space occupied by storing the PFC deadlock prevention rule by the first network device. This avoids that the first network device generates the PFC deadlock prevention rule for the first port and the third port regardless of whether a PFC deadlock occurs, and the first network device consequently occupies relatively large storage space by storing the PFC deadlock prevention rule.

In a possible implementation, the method further includes: The first network device receives, through the first port, indication information sent by the second network device, where the indication information is used to indicate that buffer usage corresponding to a third sending queue in the second network device exceeds a threshold, ingress traffic of the third sending queue is 0, and a priority of a data flow buffered in the third sending queue is the same as a priority of the first data flow. The first network device determines the quantity of times based on the indication information.

In this embodiment of this application, when the buffer usage corresponding to the third sending queue in the second network device exceeds the threshold, and the ingress traffic of the third sending queue is 0, the second network device may send the indication information to the first network device. Correspondingly, the first network device may determine, based on the indication information, to deploy the PFC deadlock prevention rule for traffic (namely, the first data flow) whose priority is the same as a priority of traffic buffered in the third sending queue. This reduces a possibility of a PFC deadlock in the network.

Optionally, the indication information may be the priority of the data flow buffered in the third sending queue.

Optionally, the indication information may be carried in a PDU. Specifically, the indication information may be encapsulated into a TLV in the PDU. It should be noted that, the PDU that carries the indication information and the PDU for determining a port orientation of a port may be a same PDU or may be different PDUs. This is not limited in this application.

In a possible implementation, in a network topology of the network, topology levels of network devices increase in a north-to-south direction.

In a possible implementation, in a network topology of the network, topology levels of network devices decrease in a north-to-south direction.

The north-to-south direction may also be understood as a direction from a root node to a top of rack switch. Generally, the top of rack switch is a type of network device in the network. Generally, the top of rack switch is located at a layer adjacent to a server in the network.

The north-to-south direction is the same as a direction from a northbound interface to a southbound interface, where the northbound interface is an interface provided for a vendor or a carrier to access and manage a network. In other words, the northbound interface is an interface provided for an upper-layer. The southbound interface is an interface provided for a vendor to manage a network device of another vendor. In other words, the southbound interface is an interface provided for a lower-layer.

According to a second aspect, a method for determining a port orientation is provided. The method includes: A second network device generates a protocol data unit PDU, where the PDU is used to determine that a first port of a first network device is an upstream port or a downstream port. The second network device sends the PDU to the first network device.

In this embodiment of this application, the first network device may determine, based on the PDU sent by the second network device, whether the first port is the upstream port or the downstream port, to provide a basis for subsequently helping an SDN controller reduce load. This avoids a problem that in the conventional technology, a network device cannot learn of the foregoing configuration, and therefore cannot help the SDN controller reduce the load.

In a possible implementation, the PDU carries a topology level of the second network device in a network; and/or the PDU carries a port orientation of a second port used by the second network device to send the PDU, where the port orientation of the second port includes that the second port is an upstream port or the second port is a downstream port.

In this embodiment of this application, the PDU carries the at least one piece of information of the topology level of the second network device and the port orientation of the second port. This is clearer for the first network device to determine whether the first port is the upstream port or the downstream port.

In a possible implementation, the second network device is a root node in the network, and the topology level of the second network device carried in the PDU is a preset value.

In this embodiment of this application, if the second network device is the root node, the topology level of the second network device is the preset value. In this way, when determining, by using the PDU, that the topology level of the second network device is the preset value, the first network device may directly determine that the second network device is the root node.

Correspondingly, the first port that communicates with the second network device is the upstream port. This simplifies a process of determining whether the first port is the upstream port or the downstream port.

In a possible implementation, the second network device is a server, the PDU carries a first TLV, and the first TLV indicates that the second network device is the server.

In this embodiment of this application, the first TLV is carried in the PDU, to indicate that the second network device is the server. In this way, when determining, by using the PDU, that the second network device is the server, the first network device may directly determine that the first port that communicates with the second network device is the downstream port. This simplifies a process of determining a port orientation of the first port.

Optionally, the first TLV may occupy an optional TLV in the PDU, or occupy a reserved TLV in the PDU.

In a possible implementation, the PDU is a link layer discovery protocol LLDP PDU.

In a possible implementation, before the second network device sends the PDU to the first network device, the method further includes: The second network device receives an LLDP request sent by the first network device, where the LLDP request is used to request the port orientation of the second port and/or the topology level of the second network device.

In this embodiment of this application, the first network device sends the LLDP request to the second network device, to trigger the second network device to feed back an LLDP PDU to the first network device. The first network device requests, in an active request manner, the port orientation of the second port and/or the topology level of the second network device in the network. This improves flexibility of obtaining the foregoing information by the first network device.

In a possible implementation, the LLDP PDU includes a second TLV, where the second TLV is used to indicate the topology level of the second network device; and/or the LLDP PDU includes a third TLV, where the third TLV is used to indicate the port orientation of the second port.

In this embodiment of this application, the topology level of the second network device and/or the port orientation of the second port may be carried in the LLDP PDU in a TLV format. In other words, an encapsulation format of a conventional LLDP PDU is used to carry the foregoing information. This avoids that network devices provided by vendors need to be compatible with a new mechanism, to support the method for determining a port orientation of a port provided in this application, and reduces changes made by the network devices provided by the vendors to be compatible with the method provided in this application.

Optionally, the second TLV or the third TLV may occupy an optional TLV in the LLDP PDU, for example, a system capability TLV, to reduce changes to the encapsulation format of the conventional LLDP PDU.

Optionally, the second TLV or the third TLV may occupy a reserved TLV (or referred to as a reserved bit) in the LLDP PDU, to reduce changes to an available TLV in the conventional LLDP PDU.

In a possible implementation, the method further includes: The second network device sends indication information to the first network device, where the indication information is used to indicate that buffer usage corresponding to a third sending queue in the second network device exceeds a threshold, ingress traffic of the third sending queue is 0, and a priority of a data flow buffered in the third sending queue is the same as a priority of the first data flow.

In this embodiment of this application, when the buffer usage corresponding to the third sending queue in the second network device exceeds the threshold, and the ingress traffic of the third sending queue is 0, the second network device may send the indication information to the first network device. Correspondingly, the first network device may determine, based on the indication information, to deploy the PFC deadlock prevention rule for traffic (namely, the first data flow) whose priority is the same as a priority of traffic buffered in the third sending queue. This reduces a possibility of a PFC deadlock in the network.

Optionally, the indication information may be the priority of the data flow buffered in the third sending queue.

Optionally, the indication information may be carried in a PDU. Specifically, the indication information may be encapsulated into a TLV in the PDU. It should be noted that, the PDU that carries the indication information and the PDU for determining a port orientation of a port may be a same PDU or may be different PDUs. This is not limited in this application.

According to a third aspect, a first network device is provided. The first network device includes modules that implement functions that need to be performed by the first network device in the foregoing method.

According to a fourth aspect, a second network device is provided. The second network device includes modules that implement functions that need to be performed by the second network device in the foregoing method.

According to a fifth aspect, a first network device is provided. The first network device includes a memory and a processor, where the memory is configured to store a computer program, and the processor is configured to invoke the computer program from the memory and run the computer program, so that the first network device performs the method in the first aspect.

According to a sixth aspect, a second network device is provided. The second network device includes a memory and a processor, where the memory is configured to store a computer program, and the processor is configured to invoke the computer program from the memory and run the computer program, so that the second network device performs the method in the second aspect.

According to a seventh aspect, a computer program product is provided. The computer program product includes computer program code. When the computer program code is run on a computer, the computer is enabled to perform the methods in the foregoing aspects.

It should be noted that, some or all of the computer program code can be stored in a first storage medium. The first storage medium can be encapsulated with a processor, or encapsulated separately from a processor. This is not specifically limited in this embodiment of this application.

According to an eighth aspect, a computer-readable medium is provided. The computer-readable medium stores program code. When the computer program code is run on a computer, the computer is enabled to perform the methods in the foregoing aspects.

DESCRIPTION OF EMBODIMENTS

For ease of understanding, terms in embodiments of this application are first described.

1. Network device: The network device is a physical entity connected to a network, such as a switch, a router, and a server. The network device may include a plurality of ports, configured to communicate with another network device.

It should be understood that, the foregoing port may be a port used when network devices are cascaded, for example, may be a port used when switches are cascaded, or may be a port used when a switch and a server are cascaded.

2. Port orientation: The port orientation is also referred to as a "port role", which may be used to describe a role of a port of a network device in a network topology. The port orientation may specifically include an upstream port and a downstream port.

The upstream port is used to refer to a port used by the network device to send upstream data. The upstream data may be understood as data transmitted in a direction from a server to a root node.

The downstream port is used to refer to a port used by the network device to send downstream data. The downstream data may be understood as data transmitted in a direction from the root node to a server.

3. Topology level of a network device: The topology level of the network device is used to indicate a layer at which the network device is located in a network (or in a network topology). For example, in a data center network, a shortest hop count from the network device to a root node may be used as the topology level of the network device in the network. Alternatively, a shortest hop count from the network device to a server may be used as the topology level of the network device in the network.

It should be noted that, the root node is also referred to as a spine node in a spine-leaf (spine-leaf) network architecture.

4. Protocol data unit (PDU): The protocol data unit is a data unit transmitted between peer layers. A PDU at a physical layer may be a data bit, a PDU at a data link layer may be a data frame (frame), a PDU at a network layer may be a data packet, a PDU at a transport layer may be a data segment, and a PDU at another higher layer may be a packet.

The following describes technical solutions of this application with reference to the accompanying drawings.

Figure 1:
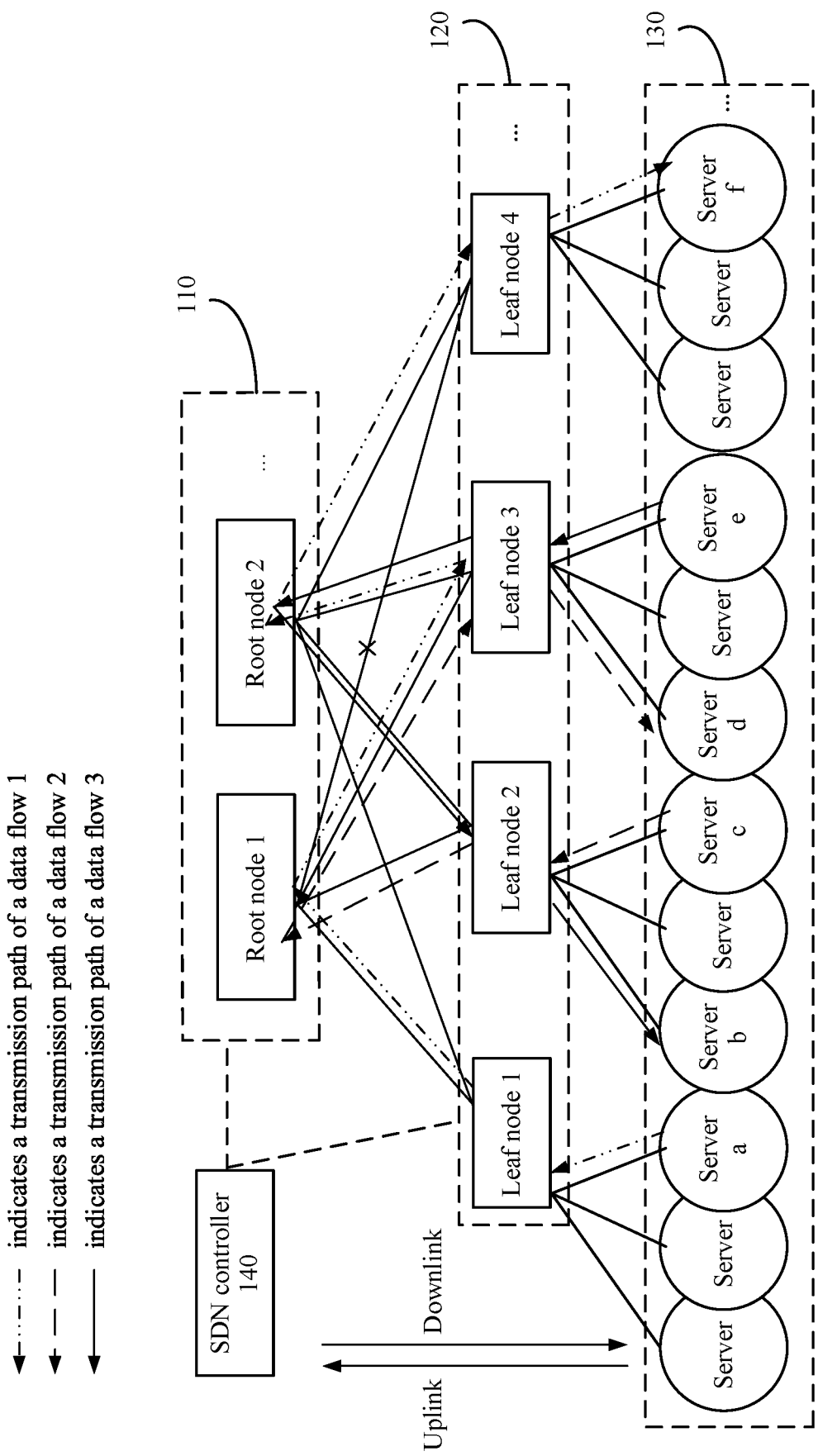
FIG. 1 is a schematic diagram of a network topology of a fat-tree network to which an embodiment of this application is applicable.

For ease of understanding, the following first describes a fat-tree network to which embodiments of this application are applicable with reference to FIG. 1. It should be understood that, the network shown in FIG. 1 is merely used as a possible network architecture to which the embodiments of this application are applicable. The embodiments of this application may be further applicable to another network form of a data center network, for example, a traditional three-layer network architecture of a data center.

FIG. 1 is a schematic diagram of a network topology of a fat-tree network to which an embodiment of this application is applicable. The fat-tree network shown in FIG. 1 includes a plurality of root nodes 110, a plurality of leaf nodes 120, a plurality of servers 130, and an SDN controller 140. It should be noted that, FIG. 1 shows only some nodes in a CLOS architecture, for example, some leaf nodes in the plurality of leaf nodes, namely, a leaf node 1, a leaf node 2, and a leaf node 3, and some root nodes in the plurality of root nodes, namely, a root node 1 and a root node 2. A specific quantity of network devices in the fat-tree network is not limited in this embodiment of this application.

In the fat-tree network architecture, network devices at a same layer cannot directly communicate with each other, and each root node is connected to all leaf nodes in a full connection manner.

The server 130 is configured to process data, provide a storage service, and the like.

The leaf node 120 is configured to read data from the server or write data to the server.

The root node 110 is configured to help leaf nodes at a same layer forward a data flow. For example, the root node 1 may forward a data flow of the leaf node 1 to the leaf node 2.

Generally, the foregoing leaf node or root node is a switch, or another network device with a data forwarding function.

The SDN controller 140 is configured to manage a network device (for example, a switch) in a data center network.

As a scale of the data center network continues to expand, the SDN controller needs to manage more network devices, and load of the SDN controller increases. A processing speed of the SDN controller affects data center performance. To reduce the load of the SDN controller, it is expected that a function originally implemented by the SDN controller can be autonomously implemented by the network device. For example, the SDN controller is released from a function of generating a priority flow control (PFC) deadlock prevention rule, and the network device autonomously generates the PFC deadlock prevention rule. However, when implementing some functions (for example, generating the PFC deadlock prevention rule) of the network device, the network device needs to learn that a port orientation of each port is an upstream port or a downstream port.

Therefore, embodiments of this application provide a method for determining a port orientation, so that a network device can learn of a port orientation of a port of the network device. This provides a basis for subsequently helping an SDN controller reduce load. The following describes a method for determining a port orientation in an embodiment of this application with reference to FIG. 2.

Figure 2:
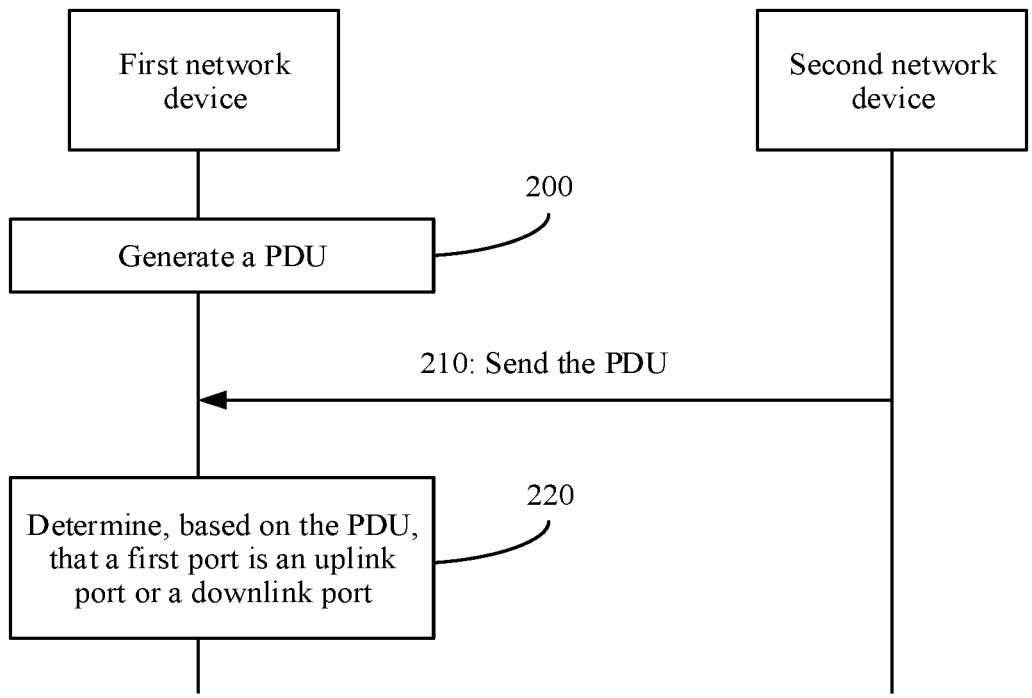
FIG. 2 is a schematic flowchart of a method for determining a port orientation according to an embodiment of this application.

FIG. 2 is a schematic flowchart of a method for determining a port orientation according to an embodiment of this application. The method shown in FIG. 2 includes step 200 to step 220. It should be noted that, the first network device and the second network device in the following may be any two network devices in the network architecture shown in FIG. 1.

200: The second network device generates a PDU.

The PDU may be used by the first network device to determine a port orientation of a first port of the first network device.

210: The second network device sends the PDU to the first network device through a second port. Correspondingly, the first network device receives the PDU through the first port.

The first port may be any one of a plurality of ports of the first network device.

The second port may be any one of a plurality of ports of the second network device.

220: The first network device determines, based on the PDU, that the first port is an upstream port or a downstream port.

Optionally, the PDU may carry a topology level of the second network device in a network, or the PDU carries a port orientation of the second port. The second port is a port used by the second network device to send the PDU. Alternatively, the PDU may carry a topology level of the second network device and a port orientation of the second port. The PDU may further carry a first TLV, and the first TLV is used to indicate whether the second network device is a server or a switch.

The first network device may determine a port orientation of the first port based on the foregoing information carried in the PDU, in other words, determine whether the first port is the upstream port or the downstream port. The following describes, based on the information carried in the PDU, a method for determining the port orientation of the first port in different cases.

For ease of understanding, before a manner of determining the port orientation is described, a manner of determining a topology level of the first network device provided in this embodiment of this application is first described. It should be noted that, the manners of determining the topology level of the first network device described below may be independently used, to determine the topology level of the first network device, or may be combined with the manner of determining the port orientation, to assist the first network device in determining the port orientation of the first port. This is not limited in this embodiment of this application.

The first network device determines the topology level of the first network device based on the PDU in many manners. The manners may mainly be classified into the following five manners based on different information carried in the PDU. Certainly, in addition to being combined with the manner of determining the port orientation, each of the following five manners of determining a topology level may be used independently. This is not limited in this application.

Manner 1 of determining the topology level: If the PDU carries the topology level of the second network device, the first network device may determine the topology level of the first network device based on the topology level of the second network device.

The network architecture shown in FIG. 1 is used as an example. In a direction from a root node to a server, topology levels of network devices at different layers increase, the first network device is the leaf node 1, and the second network device is the root node. The network devices in the network are preconfigured to send a PDU from a layer to a layer in the direction from the root node to the server. To be specific, the root node first sends the PDU through all ports, and the PDU carries a topology level 0 of the root node. After receiving the PDU, the leaf node 1 may increase the topology level 0 by 1, to obtain a topology level 1 of the leaf node 1.

In another example, the network architecture shown in FIG. 1 is used as an example.

In a direction from a root node to a server, topology levels of network devices at different layers decrease, the first network device is the leaf node 1, and the second network device is the root node. The network devices in the network are preconfigured to send a PDU from a layer to a layer in the direction from the root node to the server. To be specific, the root node first sends the PDU through all ports (namely, downstream ports), and the PDU carries a topology level max of the root node. After receiving the PDU, the leaf node 1 may decrease the topology level max by 1, to obtain a topology level max−1 of the leaf node 1.

It should be noted that, "max" may be a maximum topology level of the network architecture in the network, or may be any preset value greater than the maximum topology level.

Manner 2 of determining the topology level: If a PDU carries a topology level of a network device that sends the PDU, the first network device may determine the topology level of the first network device based on PDUs sent by a plurality of network devices, and the plurality of network devices may include the foregoing second network device.

To be specific, the first network device receives, through the first port, the plurality of PDUs sent by the plurality of network devices. The first network device determines topology levels of the plurality of network devices in the network based on the plurality of PDUs. The first network device selects a target topology level from the topology levels of the plurality of network devices. The first network device determines the topology level of the first network device based on the target topology level and a preset rule.

The preset rule may include: if the target topology level is the largest topology level in the topology levels of the plurality of network devices, decreasing the target topology level to obtain the topology level of the first network device. Alternatively, the preset rule may include: if the target topology level is the smallest topology level in the topology levels of the plurality of network devices, increasing the target topology level to obtain the topology level of the first network device. Certainly, another rule may be configured, to determine the topology level of the first network device. This is not limited in this embodiment of this application.

The "increasing the target topology level" or "decreasing the target topology level" may mean increasing or decreasing the target topology level by a preset change granularity. For example, the preset change granularity may be 1 or another value.

It should be noted that, in the foregoing method, the step of selecting the target topology level and the step of determining the topology level of the first network device may alternatively be replaced by that the first network device first adjusts the topology levels of the plurality of network devices based on a preset rule, to obtain a plurality of adjusted topology levels, and selects a target topology level of from the plurality of adjusted topology levels. For example, the first network device first increases the topology levels of the plurality of network devices by 1 to obtain a plurality of adjusted topology levels, and then selects the smallest topology level from the plurality of adjusted topology levels as the target topology level.

Optionally, the plurality of network devices are network devices directly connected to the first network device. In other words, a layer at which the plurality of network devices are located in the network is adjacent to a layer at which the first network device is located.

It should be noted that, the plurality of network devices may be located at one layer or a plurality of layers. When the plurality of network devices are located at one layer, the plurality of network devices are located at a same layer, and the layer is adjacent to the layer of the first network device. When the plurality of network devices are located at a plurality of layers, at least two network devices in the plurality of network devices are located at different layers, and the plurality of layers are adjacent to the layer of the first network device. The plurality of layers may include a layer north of the layer at which the first network device is located in the network, and a layer south of the layer at which the first network device is located. For example, when the first network device is the leaf node 1 in FIG. 1, the plurality of network devices may include the root node 1. To be specific, the root node 1 is located at a layer north of the layer at which the first network device is located in the network. The plurality of network devices may include a server a. To be specific, the server a is located at a layer south of the layer at which the first network device is located in the network.

The following describes a method for determining a topology level of a network device in an embodiment of this application by using the network architecture shown in FIG. 1 as an example. It is assumed in the direction from the root node to the server, topology levels of network devices at different layers increase. A topology level of the root node is preset to 0, and an initial value of a topology level of the leaf node is preset to max. In addition, the preset change granularity is 1. Each network device uses T for a periodicity, to periodically send a PDU through all ports, where the PDU carries a topology level of the network device that sends the PDU.

Because a total quantity of layers of the network is usually unknown, the initial value max may be a maximum count represented by bits indicating the topology level of the network device in the PDU. For example, when 2 bits are used in the PDU to indicate the topology level of the network device, the initial value max may be set to 4. In other words, the 2 bits can represent a maximum of four layers of network. If more network layers need to be represented, the quantity of bits that indicate the topology level of the network device may be increased.

Each root node in the network uses T for a periodicity, to actively send a PDU through all ports, where the PDU carries a topology level 0 of the root node.

It should be noted that, because each network device needs to send the PDU through all ports, the root node also receives a PDU sent by another node. In this case, the root node may be configured to discard the PDU.

In a periodicity 1, any leaf node (for example, the leaf node 3) in the network receives, through a plurality of ports, PDUs sent by a plurality of leaf nodes, and each PDU carries a topology level of a leaf node that sends the PDU. Because the initial value of the topology level of the leaf node in the network is max, topology levels of the plurality of leaf nodes obtained by the leaf node 3 may include the initial value max.

In this way, the leaf node 3 may select the smallest topology level from the received topology levels of the plurality of leaf nodes as a target topology level, and increase the target topology level by 1, to obtain a topology level of the leaf node 3 in the periodicity 1. In a next periodicity 2, the leaf node 3 encapsulates the topology level determined in the periodicity 1 into a PDU, and sends the PDU to another leaf node. After a preset quantity of periodicities, each leaf node in the network may learn a topology level of the leaf node itself in the network in the foregoing manner.

Optionally, the plurality of network devices may alternatively be network devices not adjacent to the first network device. For example, the plurality of network devices are root nodes, and the layer of the first network device is separated from the layer of the plurality of network devices by one or more layers. In this case, the plurality of network devices may send topology levels of the root nodes to the first network device by using the plurality of PDUs. A quantity of network devices passed by each of the plurality of the PDUs when the PDU is transmitted to the first network device, namely, a hop count required for transmitting the PDU to the first network device may be recorded in the PDU. The first network device may determine the topology level of the first network device based on the PDUs and the hop counts.

Manner 3 of determining the topology level: If a PDU carries a topology level of a network device that sends the PDU, and the topology level is a preset value, the first network device directly determines the topology level of the first network device based on the preset value.

For a root node, a topology level of the root node is usually set to a preset value, for example, 0 as described above. In this case, if the topology level of the network device that sends the PDU carried in the PDU is the preset value, the first network device may determine that a layer at which the first network device is located is adjacent to a layer at which the root node is located, and the topology level of the first network device is obtained through adjusting the preset value by a preset change granularity. It should be noted that, for description of the preset change granularity, refer to description in the foregoing manner 2 of determining the topology level.

Certainly, a topology level of a server in the network may alternatively be set to the preset value. In this case, the first network device may determine that a layer at which the first network device is located is adjacent to a layer at which the server is located, and the topology level of the first network device is obtained through adjusting the preset value by a preset change granularity.

Manner 4 of determining the topology level: If the PDU is a link layer discovery protocol (LLDP) PDU, the first network device determines the topology level of the first network device based on a port ID subtype in the LLDP PDU.

Generally, the link layer discovery protocol specifies that a switch complies with IETF RFC 2863, and a port ID subtype used by the switch is an interface name. In this case, the subtype of the port ID carried in the PDU is 5. The server complies with IEEE Std 802, and a port ID subtype used by the server is a media access control address. In this case, the subtype of the port ID carried in the PDU is 3.

In this way, when the first network device receives the LLDP PDU, if the subtype of the port ID carried in the PDU is 3, the first network device may determine that the layer at which the first network device is located is adjacent to the layer at which the server is located, and may record the topology level of the first network device, for example, 0, as a preset value.

Manner 5 of determining the topology level: If the PDU carries the first TLV, and the first TLV indicates that a network device (namely, the second network device) that sends the PDU is the server, the first network device may determine that a layer at which the first network device is located is adjacent to a layer at which the server is located, and may record the topology level of the first network device, for example, 0, as a preset value.

It should be noted that, the manner 3 of determining the topology level to the manner 5 of determining the topology level are usually used to determine a topology level of a specific node in the network, for example, a root node, or a node located at a layer adjacent to the layer at which the server is located. A topology level of a network device at another layer in the network may be determined in another manner, for example, a manner described in the manner 2 of determining the topology level.

The following describes five manners of determining a port orientation provided in this embodiment of this application. In the following manner 1 of determining a port orientation, manner 2 of determining a port orientation, and manner 3 of determining a port orientation, for a manner of determining the topology level of the first network device, and/or a manner of determining the topology level of the second network device, refer to the foregoing descriptions. Certainly, the topology level of the first network device and/or the topology level of the second network device may alternatively be indicated by an SDN controller to the first network device and the second network device. This is not limited in this embodiment of this application.

Manner 1 of determining the port orientation: The first network device determines the topology level of the first network device, and determines the port orientation of the first port based on the topology level of the first network device.

The first network device may determine the port orientation of the first port based on only the topology level of the first network device. For example, after determining that the first network device is a root node, the first network device may directly determine that port orientations of all ports are downstream ports. In another example, after determining that the layer at which the first network device is located is adjacent to the layer at which the server is located, the first network device may directly determine the first port that receives the PDU sent by the server is the downstream port. Certainly, the first network device may further determine the port orientation of the first port with reference to the topology level of the first network device and other information. A specific determining manner is specifically described in the manner 2 of determining the port orientation of the port.

Manner 2 of determining the port orientation of the port: The first network device determines the port orientation of the first port based on the topology level of the first network device and the topology level of the second network device. For determining the topology level of the first network device, refer to the foregoing manner 1 of determining the topology level to the manner 5 of determining the topology level. For brevity, details are not described herein again. The topology level of the second network device may be carried in the PDU.

When topology levels of network devices at different layers increase in the direction from the root node to the server, if the topology level of the first network device is smaller than the topology level of the second network device, the first network device may determine that the first port is the downstream port. If the topology level of the first network device is greater than the topology level of the second network device, the first network device may determine that the first port is the upstream port.

When topology levels of network devices at different layers decrease in the direction from the root node to the server, if the topology level of the first network device is greater than the topology level of the second network device, the first network device may determine that the first port is the upstream port. If the topology level of the first network device is smaller than the topology level of the second network device, the first network device may determine that the first port is the downstream port.

Manner 3 of determining the port orientation of the port: The first network device determines the port orientation of the first port based on the topology level of the second network device.

It should be understood that, that the first network device determines the port orientation of the first port based on the topology level of the second network device may include: The first network device determines the port orientation of the first port based on only the topology level of the second network device, or the first network device determines the port orientation of the first port based on the topology level of the second network device and other information. For example, the port orientation of the first port may be determined based on the topology level of the second network device and the topology level of the first network device. For a specific determining manner, refer to description in the manner 2 of determining the port orientation of the port. This is not limited in this embodiment of this application.

For example, it can be learned from the foregoing description that, if the second network device is the root node or the server, the topology level of the second network device may be set to a preset value. In this case, after the first network device determines that the topology level of the second network device is the preset value, the second network device may directly determine the first port as the upstream port.

Manner 4 of determining the port orientation of the port: The first network device determines the port orientation of the first port based on the first TLV.

According to the foregoing description, if the second network device is the server, the PDU may carry the first TLV, and the first TLV indicates that the second network device is the server. In this way, after receiving the PDU through the first port, the first network device may directly determine the first port as the downstream port.

Manner 5 of determining the port orientation of the port: The first network device may determine the port orientation of the first port based on a port ID subtype in the PDU.

As described above, the link layer discovery protocol specifies that a switch complies with IETF RFC 2863, and a port ID subtype used by the switch is an interface name. In this case, the subtype of the port ID carried in the PDU is 5. The server complies with IEEE Std 802, and a port ID subtype used by the server is a media access control address. In this case, the subtype of the port ID carried in the PDU is 3.

In this way, when the PDU received by the first network device is an LLDP PDU, if the subtype of the port ID carried in the PDU is 3, the first network device may determine that the first port is the downstream port.

In the foregoing methods for determining the port orientation of the port and determining the topology level of the network device, a plurality of network devices (for example, second network devices) in the network may periodically send PDUs autonomously, so that another network device (for example, the first network device) in the network may determine port orientations or topology levels. Certainly, the first network device may alternatively obtain the PDU from the second network device by using a request-response mechanism. The request-response mechanism can be applied to a plurality of protocols. The following uses only the LLDP as an example for description.

Optionally, the PDU is the LLDP PDU, and before step 210, the method further includes: The first network device sends an LLDP request to the second network device, where the LLDP request is used to request the port orientation of the second port of the second network device and/or the topology level of the second network device in the network. Correspondingly, the second network device may return the LLDP PDU to the first network device. This is a process of responding to the LLDP request.

Certainly, the first network device may periodically send the LLDP request to the second network device. However, to reduce a quantity of times of communication between the first network device and the second network device and reduce transmission resources occupied for sending the LLDP request, the first network device may further send the LLDP request to the second network device as required. To be specific, if the port orientation of the first port is unknown, the first network device sends the LLDP request to the second network device.

As described above, a port orientation and/or a topology level of a network device may be carried in the PDU. It should be noted that, there are many standard protocols about PDUs, so that encapsulation formats are different in different standards. With reference to FIG. 3 to FIG. 6, the following mainly describes several possible encapsulation formats in the slow protocol and the LLDP. It should be noted that, the encapsulation formats shown in FIG. 3 to FIG. 6 may further include another field already specified in a communication protocol, or another field specified in a future communication protocol. This is not limited in the embodiments of this application.

Figure 3:
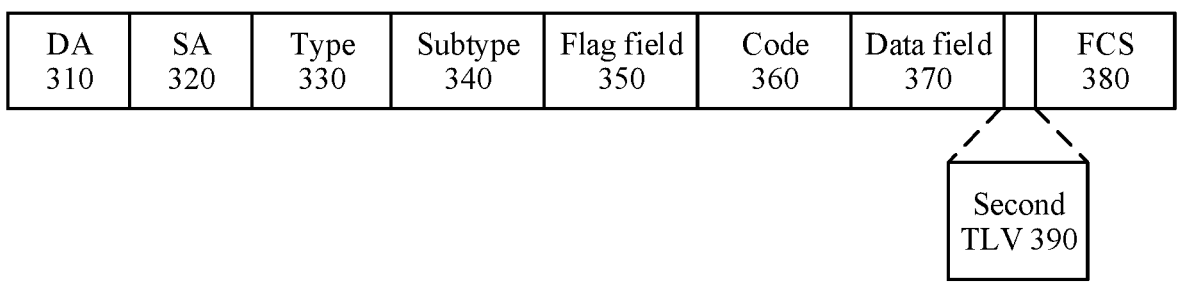
FIG. 3 is a schematic diagram of an encapsulation format of a PDU according to an embodiment of this application.
Figure 4:
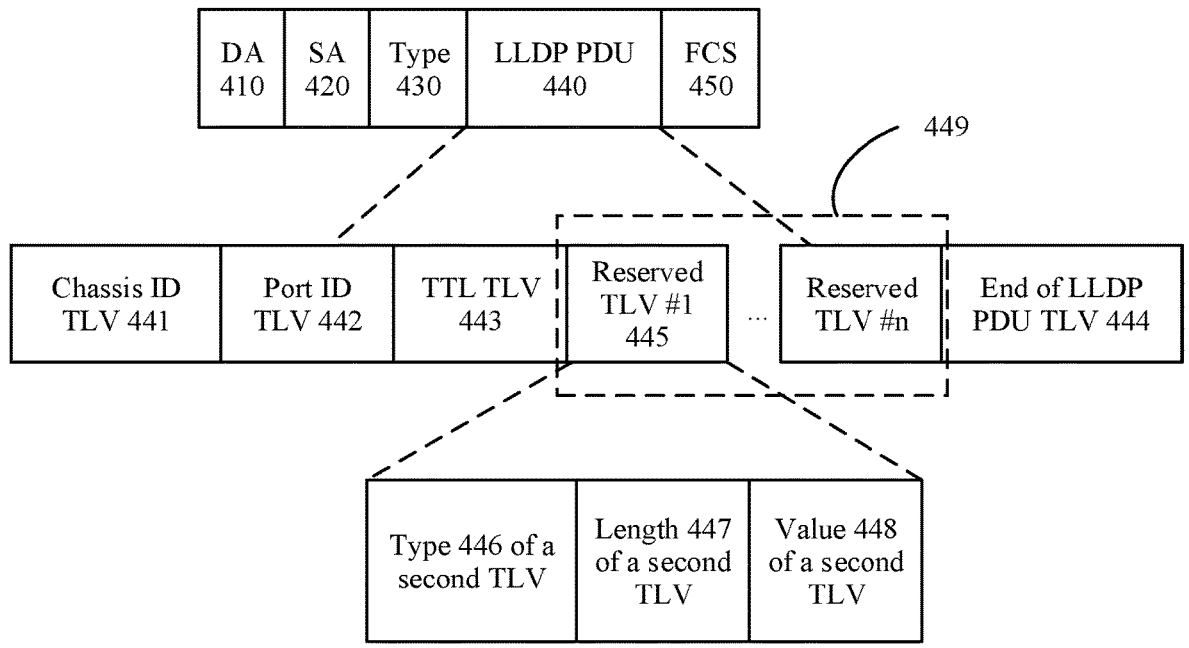
FIG. 4 is a schematic diagram of an encapsulation format of an LLDP packet according to an embodiment of this application.
Figure 5:
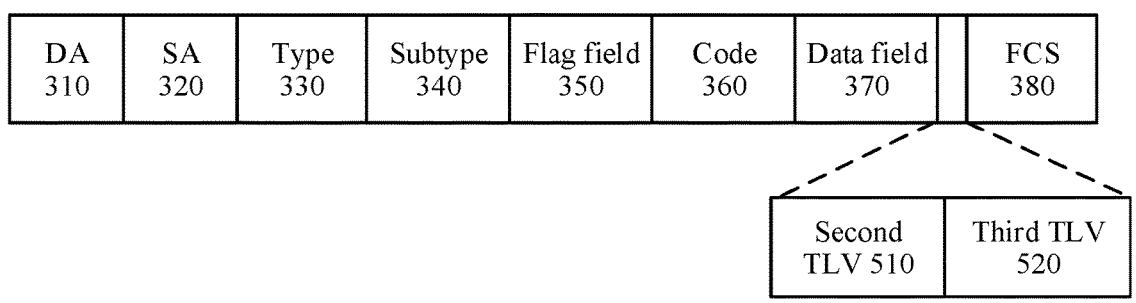
FIG. 5 is a schematic diagram of another encapsulation format of a PDU according to an embodiment of this application.
Figure 6:
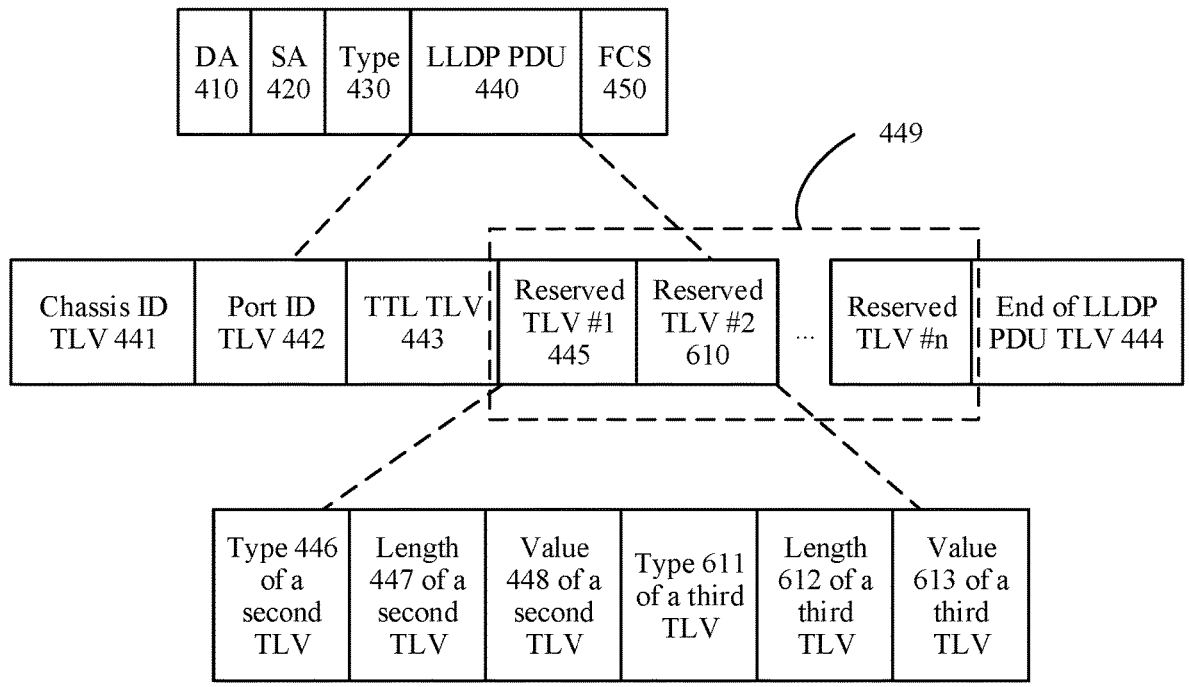
FIG. 6 is a schematic diagram of another encapsulation format of a PDU according to an embodiment of this application.

The following describes a PDU format or a packet format that carries a topology level of a network device with reference to FIG. 3 and FIG. 4, and describes a PDU format or a packet format that carries a topology level of a network device and a port orientation of a port with reference to FIG. 5 and FIG. 6.

FIG. 3 is a schematic diagram of an encapsulation format of a PDU according to an embodiment of this application. The PDU shown in FIG. 3 includes: a destination address (DA) 310, a source address (SA) 320, a type 330, a subtype 340, a flag field 350, code 360, a data field 370, and a frame check sequence (FCS) 380.

The DA 310 indicates a destination MAC address of the PDU, which is usually a multicast MAC address of 0180c2000002.

The SA 320 indicates a source MAC address of the PDU, which is usually a unicast MAC address.

The type 330 indicates a protocol type of the PDU, which is usually 0x8809.

The subtype 340 indicates a protocol subtype of the PDU, which is usually 0x03.

The flag field 350 includes status information of a network device in a network.

The code 360 indicates a type of the PDU. For example, a field value of 0x00 indicates that the PDU is an information PDU, a field value of 0x01 indicates that the PDU is an event notification PDU, and a field value of 0x04 indicates that the PDU is a loopback control PDU.

The data field 370 is used to carry a valid payload of an OAM PDU.

The FCS 380 is a tail field of the PDU, which is commonly referred to as a "frame trailer", used to verify integrity of the PDU in a transmission process, and is usually 4-byte cyclic redundancy check code.

In this embodiment of this application, a TLV indicating a topology level of the network device (where the TLV is also referred to as a "second TLV") may be carried in any field before the FCS 380 in the PDU shown in FIG. 3. For example, as shown in FIG. 3, a second TLV 390 may occupy a field before the FCS 380, and is adjacent to the FCS 380.

It should be noted that, the encapsulation format of the PDU shown in FIG. 3 may further carry only a port orientation (namely, a third TLV) of a port. In other words, the foregoing "second TLV" may be replaced with a "third TLV". For brevity, details are not described herein again.

FIG. 4 is a schematic diagram of an encapsulation format of an LLDP packet according to an embodiment of this application. The encapsulation format of the LLDP packet shown in FIG. 4 includes a DA 410, a SA 420, a type 430, an LLDP PDU 440, and an FCS 440.

The DA 410 is used to indicate a media access control (MAC) address of a receive end of the LLDP packet, and may usually be set to a multicast MAC address, for example, 0x0180-C200-000E.

The SA 420 is used to indicate a MAC address of a transmit end that sends the LLDP packet.

The type 430 is used to indicate a type of the LLDP packet, where a field value of the field in the LLDP packet is usually 0x88CC.

The LLDP PDU 440 is used to carry information, data, or the like, and may be understood as an entity for information exchange in the LLDP packet. Typically, the LLDP PDU encapsulates data or information in a type-length-value (TLV) format. The TLV format may specifically include a chassis ID TLV 441, a port ID TLV 442, a time to live (TTL) TLV 443, and an end of LLDP PDU TLV 444. The chassis ID TLV 441 is used to indicate a chassis MAC address of the transmit end. The port ID TLV 442 is used to indicate a port of the transmit end of the PDU. The TTL TLV 443 is used to limit a time period of the PDU in the network, to prevent PDU loops. The end to LLDP PDU TLV 444 is used to identify an end of the LLDP PDU.

To improve protocol scalability, a plurality of reserved TLVs 449, for example, a reserved TLV #1 to a reserved TLV #n, are further reserved in the LLDP PDU 440, where n is a positive integer. Generally, TLV types corresponding to the reserved TLVs are 9 to 126. In this embodiment of this application, a TLV indicating a topology level of a network device (namely, a "second TLV") may be carried in any one of the plurality of reserved TLVs, for example, may occupy a reserved TLV #1 445. Specifically, the second TLV may include a type 446 of the second TLV, a length (TLV length) 447 of the second TLV, and a value 448 of the second TLV. The type 446 of the second TLV may be a TLV type, namely, 9, corresponding to the reserved TLV #1. The length 447 of the second TLV is used to indicate a length of data carried in the value of the second TLV. The value 448 of the second TLV indicates an actual value, namely, the topology level of the network device.

The FCS 440 is a tail field of the LLDP packet, which is commonly referred to as a "frame trailer", used to verify integrity of the LLDP packet in a transmission process, and is usually 4-byte cyclic redundancy check code.

Optionally, only some TLVs included in the LLDP PDU 440 are listed above. Currently, the LLDP specifies that TLVs in the LLDP PDU may be classified into two types, a mandatory TLV and an optional TLV. Mandatory TLVs mainly include the chassis ID (Chassis ID TLV) 441, the port ID TLV 442, the time to live (TTL) TLV 443, and the like. Optional TLVs mainly include a port description TLV, a system name TLV, a system description TLV, and a system capabilities TLV. To reduce changes on the reserved TLVs in the LLDP PDU, an embodiment of this application further provides a manner of carrying the TLV of the topology level of the network device (namely, the second TLV). To be specific, the second TLV is configured to occupy a field corresponding to any one of the foregoing optional TLVs.

It should be noted that, the encapsulation format of the LLDP packet shown in FIG. 4 may further carry only a port orientation (namely, a third TLV) of a port. In other words, the foregoing "second TLV" may be replaced with a "third TLV". For brevity, details are not described herein again.

FIG. 5 is a schematic diagram of an encapsulation format of a PDU according to an embodiment of this application. It should be noted that, fields that have a same meaning in an encapsulation format of a PDU shown in FIG. 5 and in the encapsulation format of the PDU shown in FIG. 3 use a same number. For a specific meaning, refer to the foregoing description. For brevity, details are not described herein again.

The PDU shown in FIG. 5 includes: a destination address (Destination Address, DA) 310, a source address (SA) 320, a type 330, a subtype 340, a flag field 350, code 360, data field 370, and a frame check sequence (FCS) 380. In this embodiment of this application, a TLV indicating a topology level of a network device (where the TLV is also referred to as a "second TLV") and a TLV indicating a port orientation of a port (also referred to as a "third TLV") may be carried in any field before the FCS 380 in the PDU shown in FIG. 5. For example, as shown in FIG. 5, a second TLV 510 and a third TLV 520 may occupy fields before the FCS 380, and are adjacent to the FCS 380.

It should be noted that, positions of the second TLV 510 and the third TLV 520 may be exchanged. In other words, the third TLV may be located in a field before the second TLV. The second TLV and the third TLV may be adjacent or not. This is not limited in this embodiment of this application.

FIG. 6 is a schematic diagram of an encapsulation format of a PDU according to an embodiment of this application. It should be noted that, fields that have a same meaning in an encapsulation format of a PDU shown in FIG. 6 and in the encapsulation format of the PDU shown in FIG. 4 use a same number. For a specific meaning, refer to the foregoing description. For brevity, details are not described herein again.

The encapsulation format of the LLDP packet shown in FIG. 6 includes a DA 410, a SA 420, a type 430, an LLDP PDU 440, and an FCS 440. A plurality of reserved TLVs 449, for example, a reserved TLV #1 to a reserved TLV #n, are reserved in the LLDP PDU 440, where n is a positive integer. Generally, TLV types corresponding to the reserved TLVs are 9 to 126.

In this embodiment of this application, a TLV indicating a topology level of a network device (namely, a "second TLV") may be carried in any one of the plurality of reserved TLVs, for example, may occupy a reserved TLV #1 445. Specifically, the second TLV may include a type 446 of the second TLV, a length (TLV length) 447 of the second TLV, and a value 448 of the second TLV. The type 446 of the second TLV may be a TLV type, namely, 9, corresponding to the reserved TLV #1. The length 447 of the second TLV is used to indicate a length of data carried in the value of the second TLV. The value 448 of the second TLV indicates an actual value, namely, the topology level of the network device.

A TLV indicating a port orientation (namely, a "third TLV") of a port may be carried in any one of the plurality of reserved TLVs, for example, may occupy a reserved TLV #2 610. Specifically, the third TLV may include a TLV type 611, a TLV length 612, and a TLV value 613. The type 612 of the third TLV may be a TLV type, namely, 10, corresponding to the reserved TLV #2. The length 612 of the third TLV is used to indicate a length of data carried in the value of the third TLV. The value 613 of the third TLV indicates an actual value, namely, the port orientation of the port.

Optionally, only some TLVs included in the LLDP PDU 440 are listed above. Currently, the LLDP specifies that TLVs in the LLDP PDU may be classified into two types, a mandatory TLV and an optional TLV. Mandatory TLVs mainly include the chassis ID TLV 441, the port ID TLV 442, the time to live (TTL) TLV 443, and the like. Optional TLVs mainly include a port description TLV, a system name TLV, a system description TLV, and a system capabilities TLV. To reduce changes on the reserved TLVs in the LLDP PDU, an embodiment of this application further provides a manner of carrying the second TLV and the third TLV. To be specific, the second TLV and the third TLV are configured to occupy fields corresponding to any two of the foregoing optional TLVs.

Figure 7:
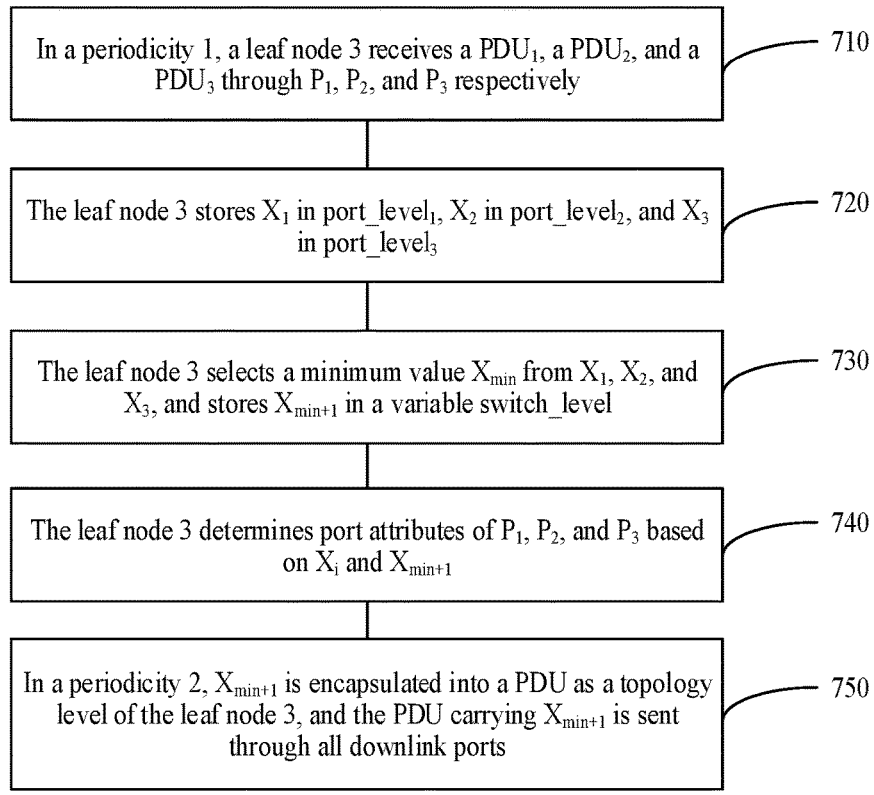
FIG. 7 is an encapsulation format of an LLDP request according to an embodiment of this application.

The following describes an encapsulation format of an LLDP request according to an embodiment of this application with reference to FIG. 7. The LLDP request shown in FIG. 7 includes a DA 710, a SA 720, a type 730, an LLDP PDU 740, and an FCS 770.

The DA 710 is used to indicate a media access control (MAC) address of a receive end of the LLDP request, and may usually be set to a multicast MAC address, for example, 0x0180-C200-000E.

The SA 720 is used to indicate a MAC address of a transmit end that sends the LLDP request.

The type 730 is used to indicate a type of the LLDP request.

The LLDP PDU 740 is used to carry information, data, or the like, and may be understood as an entity for LLDP information exchange. Typically, the LLDP PDU encapsulates data or information in a type-length-value (TLV) format. The TLV format may specifically include a chassis ID TLV 741, a port ID TLV 742, a time to live (TTL) TLV 743, and an end of LLDP PDU TLV 744. The chassis ID TLV 741 is used to indicate a chassis MAC address of the transmit end. The port ID TLV 742 is used to indicate a port of the transmit end of the LLDP request. The TTL TLV 743 is used to limit a time period of the LLDP request in the network, to prevent LLDP request loops. The end to LLDP PDU 744 is used to identify an end of the LLDP PDU.

To improve protocol scalability, a plurality of reserved TLVs 749, for example, a reserved TLV #1 to a reserved TLV #n, are further reserved in the LLDP PDU 740, where n is a positive integer. Generally, TLV types corresponding to the reserved TLVs are 9 to 126. In this embodiment of this application, a TLV used to request a topology level of a network device and/or a TLV used to request a port orientation of a port (collectively referred to as a "request TLV") may be carried in any one of the plurality of reserved TLVs.

For example, the request TLV may only occupy a reserved TLV #1 745. Specifically, the request TLV may include a type 746 of the request TLV, a length (TLV length) 747 of the request TLV, and a value 748 of the request TLV. The type 746 of the request TLV may be a TLV type, namely, 9, corresponding to the reserved TLV #1. The length 747 of the request TLV is used to indicate a length of data carried in the value of the request TLV. The value 748 of the request TLV indicates an actual value, namely, the topology level of the network device and/or the port orientation of the port.

The FCS 740 is a tail field of the LLDP packet, which is commonly referred to as a "frame trailer", used to verify integrity of the LLDP packet in a transmission process, and is usually 4-byte cyclic redundancy check code.

Optionally, only some TLVs included in the LLDP PDU 740 are listed above. Currently, the LLDP specifies that TLVs in the LLDP PDU may be classified into two types, a mandatory TLV and an optional TLV. Mandatory TLVs mainly include the chassis ID TLV 741, the port ID TLV 742, the time to live (TTL) TLV 743, and the like. Optional TLVs mainly include a port description TLV, a system name TLV, a system description TLV, and a system capabilities TLV. To reduce changes on the reserved TLVs in the LLDP PDU, an embodiment of this application further provides a manner of carrying a request TLV. To be specific, the request TLV is configured to occupy a field corresponding to any one of the foregoing optional TLVs.

It should be noted that, the foregoing encapsulation format of the LLDP request corresponds to the encapsulation format of the LLDP packet. For example, when the LLDP request is used to request the topology level of the network device, the LLDP packet may use the encapsulation format shown in FIG. 4. When the LLDP request is used to request the topology level of the network device and the port type of the port, the LLDP packet may use the encapsulation format shown in FIG. 5.

The following uses the network architecture shown in FIG. 1 as an example to describe a method for determining a port orientation of a port in an embodiment of this application with reference to a specific example. It should be noted that, the following specific example is merely for ease of understanding this application, but does not limit the scope of this application.

FIG. 7 is a schematic flowchart of a method for determining a port orientation of a port according to an embodiment of this application. The method shown in FIG. 7 includes step 710 to step 750. It is assumed in a direction from a root node to a server, topology levels of network devices at different layers increase by 1. A topology level of the root node is preset to 0, an initial value of a topology level of a leaf node is preset to max, and an initial port orientation of a port of each node (including the root node and the leaf node) in a network is preset to be a downstream port. Each network device uses T for a periodicity, to periodically send a PDU through all downstream ports, where the PDU carries a topology level of the network device that sends the PDU.

Because a total quantity of layers of the network is usually unknown, the initial value max may be a maximum count represented by bits indicating the topology level of the network device in the PDU. For example, when 2 bits are used in the PDU to indicate the topology level of the network device, the initial value max may be set to 4. In other words, the 2 bits can represent a maximum of four layers of network. If more network layers need to be represented, the quantity of bits that indicate the topology level of the network device may be increased.

Each root node in the network uses T for a periodicity, to actively send a PDU through all ports, where the PDU carries a topology level 0 of the root node. It should be noted that, for the root node, all ports are downstream ports.

It should be further understood that, because each network device (including the root node and the leaf node) needs to send the PDU through all ports, the root node also receives a PDU sent by the leaf node. In this case, the root node may be configured to discard the PDU sent by another node.

For any leaf node in the network, a variable switch_level is configured on the leaf node, where switch_level is used to store a topology level of the leaf node, and an initial value of switch_level is max. The leaf node further configures a variable port_level for each port, where port_level is used to store a topology level of the node determined based on the topology level of the network device carried in the PDU received through the port, and an initial value of port_level is also max.

The following uses a leaf node 3 as an example to describe a method for determining the port orientation of the port. A method for determining a port orientation of a port by another leaf node in the network is similar to this method. For brevity, details are not described again. It is assumed that the leaf node 3 has three ports, represented by $P_1$, $P_2$, and $P_3$. A variable corresponding to $P_1$ is $port\_level_1$, a variable corresponding to $P_2$ is $port\_level_2$, and a variable corresponding to $P_3$ is $port\_level_3$.

710: In a periodicity 1, the leaf node 3 receives a $PDU_1$, a $PDU_2$, and a $PDU_3$ through $P_1$, $P_2$, and $P_3$ respectively, where a topology level of a network device carried in the $PDU_1$ is $X_1$, and a topology level of a network device carried in the $PDU_2$ is $X_2$. A topology level of the network device carried in the $PDU_3$ is $X_3$.

720: The leaf node 3 stores $X_1$ in $port\_level_1$, $X_2$ in $port\_level_2$, and $X_3$ in $port\_level_3$.

It should be noted that, if the periodicity 1 is an initial periodicity for determining a port orientation of a port, and an initial value of a topology level of the leaf node is max, $X_1$, $X_2$, and $X_3$ indicate that a value of the topology level of the leaf node is max, and a value of a topology level of the root node is 0.

730: The leaf node 3 selects a minimum value $X_{min}$ from $X_1$, $X_2$, and $X_3$, and stores $X_{min}+1$ into the variable switch_level.

It should be noted that, if $X_1$, $X_2$, and $X_3$ are equal, $X_{min}$ is equal to any value of $X_1$, $X_2$, and $X_3$.

740: The leaf node 3 determines port orientations of $P_1$, $P_2$, and $P_3$ based on $X_i$ and $X_{min}+1$, where i=1, 2, and 3.

Specifically, if $X_i < X_{min}+1$, it may be determined that a port of the leaf node 3 corresponding to $X_i$ is an upstream port. If $X_i > X_{min}+1$, it may be determined that a port of the leaf node 3 corresponding to $X_i$ is a downstream port.

750: In a periodicity 2, $X_{min}+1$ is encapsulated into a PDU as the topology level of the leaf node 3, and the PDU carrying $X_{min}+1$ is sent through all downstream ports.

It should be noted that, the periodicity 2 is the next periodicity of the periodicity 1. The leaf node 3 still receives a PDU sent by another node through a downstream port in the periodicity 2. The leaf node 3 may re-perform the foregoing step 710 to step 750 to determine a port orientation of each port.

After a plurality of preset periodicities, if a port orientation of a port of each leaf node in the network becomes stable, PDU sending may be stopped. In this case, the port orientation of the port determined by each leaf node is relatively accurate.

Figure 8:
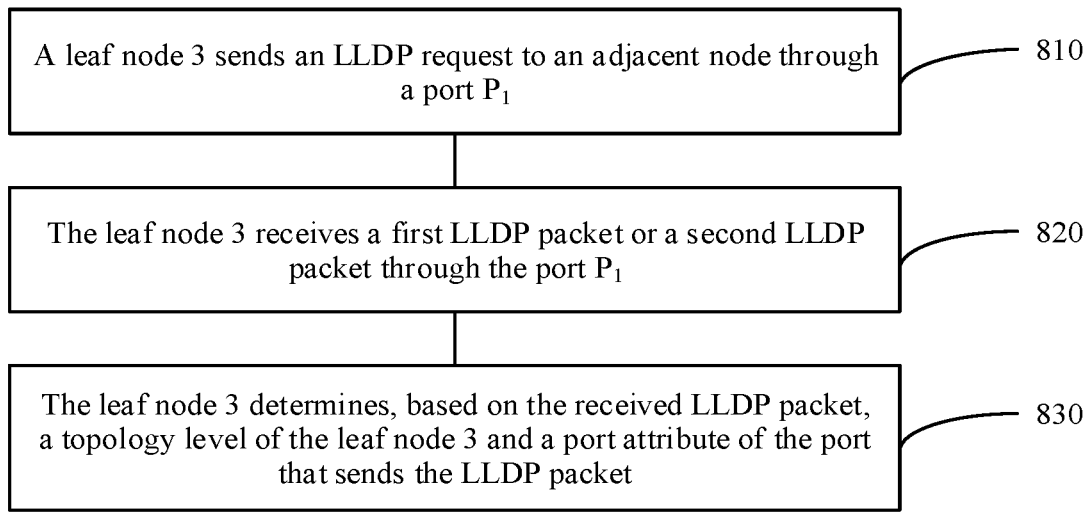
FIG. 8 is a method for determining a port orientation of a port based on the LLDP according to an embodiment of this application.

The following uses the network architecture shown in FIG. 1 as an example to describe a method for determining a port orientation of a port based on the LLDP in an embodiment of this application with reference to a specific example. The method shown in FIG. 8 includes step 810 to step 830. It is assumed that in a direction from a root node to a server, topology levels of nodes at different layers decrease by 1, and it is pre-determined that if a network device is adjacent to a server, a topology level of the network device is 1. The following uses an example in which a leaf node 3 sends an LLDP request for description. It is assumed that a port orientation of a port $P_1$ of the leaf node 3 is unknown.

810: The leaf node 3 sends the LLDP request to an adjacent node through the port $P_1$, to request a topology level and a port orientation of the adjacent node.

When the adjacent node is a leaf node, a leaf node 2 receives a first LLDP request through a port $Q_1$, where the first LLDP request is used to request a topology level of the leaf node 2 and a port orientation of a second port $Q_1$.

If the topology level of the leaf node 2 and the port orientation of the port $Q_1$ are known, the leaf node 2 sends a first LLDP packet to the leaf node 3 through the port $Q_1$, where the first LLDP packet carries the topology level of the leaf node 2 and the port orientation of the port $Q_1$. If the topology level of the leaf node 2 and the port orientation of the port $Q_1$ are unknown, the leaf node 2 is configured to ignore the first LLDP request.

When the adjacent node is a server, the leaf node 3 sends a second LLDP request to a server 1 through the $P_2$, where the second LLDP request is used to request a topology level of the server 1 and a port orientation of a port of the server 1. Correspondingly, the server feeds back the second LLDP packet to the leaf node 3.

820: The leaf node 3 receives the first LLDP packet or the second LLDP packet through the port $P_1$.

830: The leaf node 3 determines, based on the received LLDP packet, a topology level of the leaf node 3 and a port orientation of a port that sends an LLDP packet.

The LLDP packet is the first LLDP packet. If the topology level of the leaf node 2 obtained by the leaf node 3 from the first LLDP packet is M, and the port orientation of the port $Q_1$ is a downstream port, the leaf node 3 may determine that the topology level of the leaf node 3 is M+1, and the port $P_1$ is an upstream port, where M is a positive integer.

If the topology level of the leaf node 2 obtained by the leaf node 3 from the first LLDP packet is Z, and the port orientation of the port $Q_1$ is an upstream port, the leaf node 3 may determine that the topology level of the leaf node 3 is Z−1, and the port $P_1$ is a downstream port, where Z is a positive integer greater than or equal to 1.

When the LLDP packet is the second LLDP packet, the leaf node 3 may determine, based on a port ID subtype in the second LLDP packet, that the adjacent node is the server. In this case, the leaf node 3 may determine that the port $P_1$ is a downstream port, and the topology level of the leaf node 3 is 1.

It should be noted that, as described above, the LLDP specifies that a port ID subtype applicable to the server is usually a MAC address. In other words, a value of the subtype of the port ID carried in the second LLDP packet is 5, different from a port ID subtype used by a switch. Therefore, the leaf node 3 may directly determine, based on the subtype of the port ID in the second LLDP packet, that a transmit end of the second LLDP packet is the server.

It should be further understood that, when the adjacent node is the server, the leaf node 3 may directly determine the topology level of the leaf node 3 and the port orientation of the port $P_1$ based on the subtype of the port ID. Therefore, the second LLDP packet may not carry a topology level 0 of the server and the port orientation of the port used by the server to send the second LLDP packet. Certainly, to improve accuracy of determining the topology level and the port orientation of the port by the leaf node 3, the second LLDP packet may also carry a topology level of the server and the port orientation of the port used to send the second LLDP packet.

It should be noted that, before the process described in step 810 to step 830, the leaf node 3 may obtain a plurality of topology levels of leaf nodes 3. For example, before determining the port orientation of the port $P_1$, the leaf node 3 has learned that a topology level of the leaf node 3 is m, where m is a positive integer and is different from the topology level determined by the leaf node 3 in the foregoing step 830. Alternatively, if port orientations of a plurality of ports of the leaf node 3 are unknown, the leaf node 3 may obtain a plurality of different topology levels of adjacent nodes from a plurality of adjacent nodes. As a result, the leaf node 3 determines a plurality of different topology levels of the leaf node 3. In this case, the leaf node 3 may select the largest topology level from the plurality of topology levels of the leaf nodes 3, and use the largest topology level as the topology level of the leaf node 3.

Figure 9:
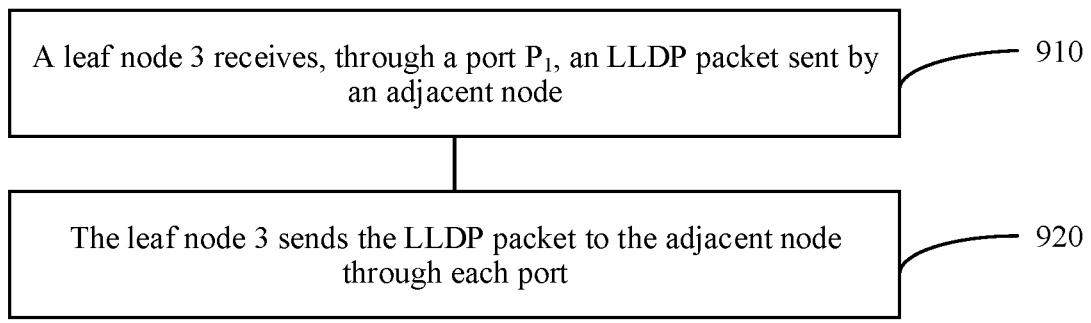
FIG. 9 is a method for determining a port orientation of a port based on the LLDP according to another embodiment of this application.

The following uses the network architecture shown in FIG. 1 as an example to describe a method for determining a port orientation of a port based on the LLDP in another embodiment of this application with reference to a specific example. The method shown in FIG. 9 includes step 910 to step 920. It is assumed that in a direction from a root node to a server, topology levels of nodes at different layers decrease by 1, and it is pre-determined that if a network device is adjacent to a server, a topology level of the network device is 1. Within a preset time period, the network device in a network shown in FIG. 9 sends an LLDP packet to an adjacent network device through all ports.

The following uses a leaf node 3 as an example to describe a method for determining the port orientation of the port. A method for determining a port orientation of a port by another leaf node in the network is similar to this method. For brevity, details are not described again. It is assumed that the leaf node 3 has three ports, represented by $P_1$, $P_2$, and $P_3$.

910: The leaf node 3 receives, through the port $P_1$, an LLDP packet sent by an adjacent node.

If a port ID subtype carried in the LLDP packet is a port ID subtype used by the server, the leaf node 3 may directly determine that the port $P_1$ is a downstream port, and a topology level of the leaf node 3 is 1.

It should be noted that, for description of the subtype of the port ID, refer to the foregoing description. For brevity, details are not described herein again.

It is assumed that the LLDP packet carries a topology level A' of the adjacent node and a port orientation of a port, which is a downstream port, and the topology level of the leaf node 3 recorded by the leaf node 3 is B', where A' is a positive integer greater than 1, and B' is a positive integer. When A'−1<B', the leaf node 3 updates the topology level of leaf node 3 to A'−1, and marks the port $P_1$ as an upstream port. When A'−1>B', the leaf node 3 does not update the topology level of leaf node 3, and marks the port $P_1$ as an upstream port.

Certainly, in the foregoing case, if the leaf node 3 does not record the topology level of the leaf node 3, the leaf node 3 may directly use A'−1 as the topology level of the leaf node 3.

It is assumed that the LLDP packet carries a topology level A of the adjacent node and a port orientation of a port, which is an upstream port, and the topology level of the leaf node 3 recorded by the leaf node 3 is B, where A is a positive integer greater than 1, and B is a positive integer. When A+1<B, the leaf node 3 updates the topology level of leaf node 3 to A+1, and marks the port $P_1$ as a downstream port. When A+1>B, the leaf node 3 does not update the topology level of leaf node 3, and marks the port $P_1$ as a downstream port.

Certainly, in the foregoing case, if the leaf node 3 does not record the topology level of the leaf node 3, the leaf node 3 may directly use A+1 as the topology level of the leaf node 3.

920: The leaf node 3 sends the LLDP packet to the adjacent node through each port, where the packet carries the topology level of the leaf node 3 and a port orientation of a port used for sending the LLDP packet.

The foregoing method for determining the topology level of the network device and determining the port orientation of the port may be applied to various scenarios. That the method for determining the port orientation of the port is applied to a scenario in which a PFC deadlock prevention rule is deployed is used as an example to describe the method in the embodiments of this application below. For ease of understanding, the following first describes a priority flow control (Priority flow control, PFC) policy and formation of a PFC deadlock based on the network topology shown in FIG. 1.

In the network shown in FIG. 1, the foregoing PFC policy may be used to transmit a data flow. PFC is a priority-based flow control policy. According to the PFC, eight virtual channels are allowed to be created on an Ethernet link, and one priority is assigned to each virtual channel. Any virtual channel can be paused and restarted independently, and traffic from another virtual channel can be transmitted uninterrupted. This method enables the network to create a loss-free service for a single virtual tunnel, so that traffic on the virtual channel can coexist with other traffic on a same interface.

The following describes generation of the PFC deadlock with reference to transmission paths of a data flow 1, a data flow 2, and a data flow 3 shown in FIG. 1 as an example. The data flow 1, the data flow 2, and the data flow 3 have a same priority, and are transmitted in the network through a virtual channel formed by a queue 5.

In the network shown in FIG. 1, each root node is connected to all leaf nodes in a full connection manner, and network devices at a same layer cannot directly communicate with each other. Therefore, when there is no link fault in the network, a flow direction of a data flow is usually an upstream direction only or a downstream direction only, or a direction from upstream (up) to downstream (down), for example, the transmission path of the data flow 2 and the transmission path of the data flow 3 in FIG. 1. The data flow 2 is a data flow that needs to be transmitted from a server c to a server d, and the transmission path of the data flow 2 is: the server c—a leaf node 2—a root node 1—a leaf node 3—the server d. The data flow 3 is a data flow that needs to be transmitted from a server e to a server b, and the transmission path of the data flow 3 is: the server e—the leaf node 3—a root node 2—the leaf node 2—the server b.

However, when a link fault occurs between two network devices at different layers, a data flow from downstream to upstream is generated in the network. For example, after a link between the root node 2 and a leaf node 4 fails, the data flow 1 that needs to be transmitted from a server a to a server f can be transmitted only along the transmission path of the data flow 1 shown in FIG. 1, namely, the server a—a leaf node 1—the root node 1—the leaf node 3—the root node 2—the leaf node 4—the server f. The data flow 1 is a downstream data flow from the root node 1 to the leaf node 3, and is an upstream data flow from the leaf node 3 to the root node 2.

Once a data flow in the downstream-upstream direction is generated in the network, the data flow may form a loop with another data flow that is transmitted in a normal direction and that has a same priority in the network. A shape of the loop is similar to the number 8. For example, in FIG. 1, the data flow 1, the data flow 2, and the data flow 3 form a loop between the root node 1, the root node 2, the leaf node 2, and the leaf node 3.

Figure 10:
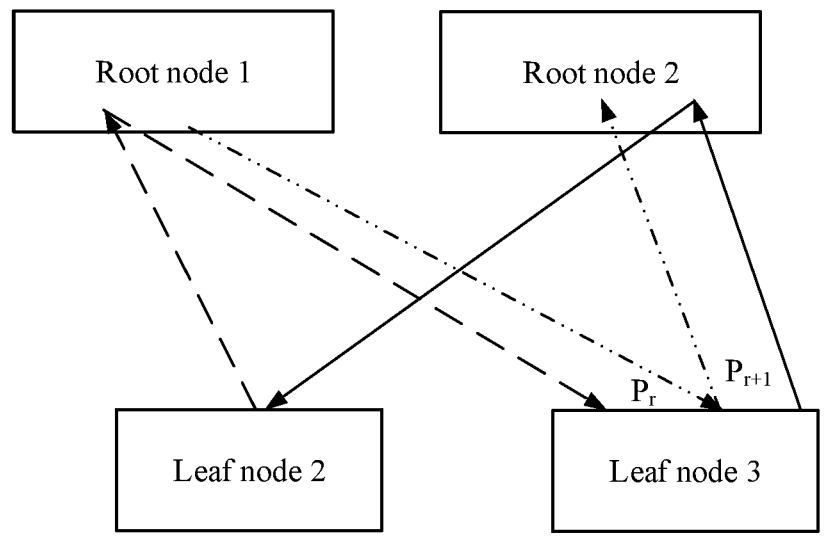
FIG. 10 is a schematic diagram of a network topology of a fat-tree network to which an embodiment of this application is applicable.

For ease of description of the PFC deadlock, FIG. 10 shows only the four nodes in the loop in FIG. 1 and the three data flows that form the loop. In the loop shown in FIG. 10, when consumption of buffer usage corresponding to a queue 5 in the leaf node 3 exceeds a threshold, in other words, temporary congestion occurs, the leaf node 3 sends back pressure information (also referred to as a "PFC pause frame") in an opposite direction of an ingress direction of data. To be specific, the leaf node 3 sends the back pressure information to the root node 1 in an opposite direction of an ingress direction of the data flow 1 and the data flow 2. Correspondingly, after receiving the back pressure information, the root node 1 stops sending or delays sending of remaining data of the data flow 1 and the data flow 2 based on an indication of the back pressure information, and buffers the remaining data in buffer corresponding to a local queue 5. If consumption of the buffer corresponding to the queue 5 in the root node 1 exceeds the threshold, the root node 1 sends the back pressure information to the leaf node 2 in an opposite direction of an ingress direction of the data flow 2. Correspondingly, after receiving the back pressure information, the leaf node 2 stops sending or delays sending of remaining data of the data flow 2 based on the indication of the back pressure information, and buffers the remaining data in buffer corresponding to a local queue 5. If consumption of the buffer corresponding to the queue 5 in the leaf node 2 exceeds the threshold, the leaf node 2 continues to send the back pressure information to the root node 2 in an opposite direction of an ingress direction of the data flow 3. Correspondingly, after receiving the back pressure information, the root node 2 stops sending or delays sending of remaining data of the data flow 3 based on the indication of the back pressure information, and buffers the remaining data in buffer corresponding to a local queue 5. If consumption of the buffer corresponding to the queue 5 in the root node 2 exceeds the threshold, the root node 2 continues to send the back pressure information to the leaf node 3 in an opposite direction of an ingress direction of the data flow 3.

Due to the level-by-level back pressure, no data flow is transmitted in the queues 5 of the root node 1, the root node 2, the leaf node 2, and the leaf node 3 as a result. In other words, traffic buffered in the queues 5 between the four nodes cannot be sent. Therefore, consumption of buffer usage of the four nodes exceeds the threshold for a long time, and a PFC deadlock occurs.

In conclusion, a root cause of the PFC deadlock is that a downstream-upstream data flow is generated in the network. In addition, when the data flow in the downstream-upstream direction is transmitted on a network device, two upstream ports in the network device are used. For example, when the data flow 1 passes through the leaf node 3, port orientations of an ingress port $P_r$ and an egress port $P_{r+1}$ are both upstream ports. Therefore, to avoid the downstream-upstream data flow in the network and prevent the PFC deadlock, a PFC deadlock prevention rule may be deployed on each leaf node in the network. For example, the PFC deadlock prevention rule may be deployed on the leaf node 3. The PFC deadlock prevention rule may include: if {ingress port=Pr, egress port=$P_{r+1}$, queue=5}, performing: switching to a queue 6, and modifying a priority field of a data flow to a priority corresponding to the queue 6. The PFC deadlock prevention rule indicates that when an ingress port of the data flow is Pr, an egress port is $P_{r+1}$, and a corresponding queue is the queue 5, the leaf node 3 needs to directly buffer the data flow in the queue 6, and modify a priority of the data flow from a priority corresponding to the queue 5 to the priority corresponding to the queue 6. In other words, a priority of traffic that passes through two upstream ports of a network device is switched, to prevent the PFC deadlock.

As described above, a cause of generation of the data flow in the downstream-upstream direction is usually a link fault. In other words, the generation of the data flow in the downstream-upstream direction is random. Such randomness is unpredictable. Therefore, to avoid the generation of the data flow in the downstream-upstream direction, before a data flow is transmitted on the network, an SDN controller (for example, the SDN controller 140) usually deploys a PFC deadlock prevention rule in advance for every two upstream ports of each network device in the network. Consequently, the SDN controller may be overloaded.

Figure 11:
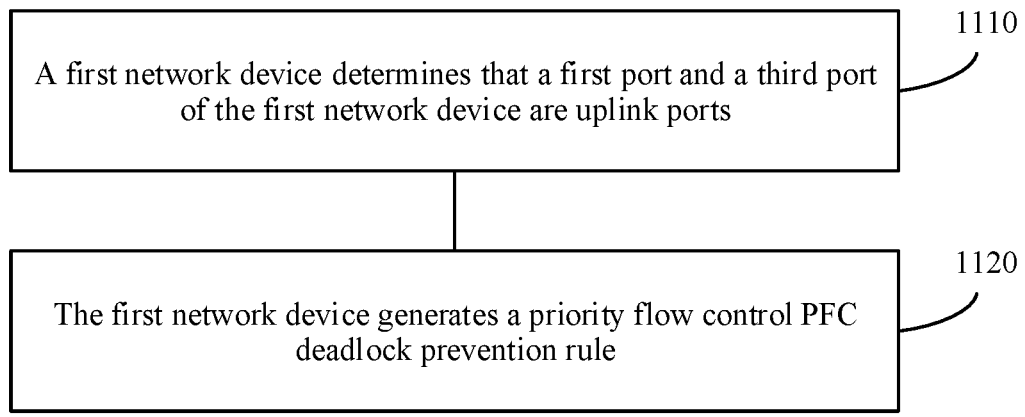
FIG. 11 is a flowchart of a method for deploying a PFC deadlock prevention rule according to an embodiment of this application.

To reduce pressure generated when the SDN controller deploys the PFC deadlock prevention rule, this application further provides a new manner of deploying a PFC deadlock prevention rule. To be specific, a network device autonomously generates a PFC deadlock prevention rule based on an upstream port of the network device. The following describes a flowchart of a method for deploying a PFC deadlock prevention rule according to an embodiment of this application with reference to FIG. 11. The method shown in FIG. 11 may be performed by a first network device. The first network device may be any leaf node in the network devices shown in FIG. 1. The first network device includes a plurality of sending queues, the plurality of sending queues include a first sending queue and a second sending queue, and the first sending queue is an original sending queue corresponding to a first data flow. FIG. 11 includes step 1110 to step 1120.

1110: The first network device determines that a first port and a third port of the first network device are upstream ports.

It should be noted that, for a method for determining the first port and the third port by the first network device, refer to the foregoing method for determining the port orientation of the port. For brevity, details are not described herein again. Certainly, an SDN controller may also directly indicate, to the first network device, that the first port and the third port are upstream ports.

1120: The first network device generates a priority flow control PFC deadlock prevention rule, where the PFC deadlock prevention rule is used to indicate to buffer the first data flow to the second sending queue, an ingress port of the first data flow is the first port, and an egress port of the first data flow is the third port.

Optionally, a priority corresponding to the first sending queue is different from a priority corresponding to the second sending queue. However, in a final data scheduling process, the first sending queue and the second sending queue may be considered as queues corresponding to a same priority, and data scheduling is performed according to a preset proportion, to avoid out-of-order transmission of data flows caused by queue switching.

Optionally, one or more PFC deadlock prevention rules may be deployed for a same group of upstream ports.

For example, a plurality of PFC deadlock prevention rules may be deployed for directions of different data flows of two upstream ports. A PFC deadlock prevention rule that may be deployed for the upstream port Pr and the upstream port $P_{r+1}$ in the leaf node 2 includes: if {ingress port=Pr, egress port=$P_{r-1}$, queue=5}, performing: switching to a queue 6, and modifying a priority field of a data flow to a priority corresponding to the queue 6; and if {ingress port=$P_{r+1}$, egress port=Pr, queue=5}, performing: switching to the queue 6, and modifying the priority field of the data flow to the priority corresponding to the queue 6.

In another example, a plurality of PFC deadlock prevention rules may be deployed for two upstream ports for different transmission manners. A PFC deadlock prevention rule that may be deployed for the upstream port Pr and the upstream port $P_{r+1}$ in the leaf node 2 includes: if {ingress port=Pr, egress port=$P_{r+1}$, queue=5}, performing: switching to a queue 6, and modifying a priority field of a data flow to a priority corresponding to the queue 6; and if {ingress port=$P_{r+1}$, egress port=Pr, queue=5}, performing: switching to a queue 3, and modifying the priority field of the data flow to a priority corresponding to the queue 3. The queue 5 and the queue 6 are lossless queues, used to transmit lossless traffic. The queue 3 is a lossy queue, used to transmit lossy traffic.

It should be noted that, the foregoing traffic may be determined, based on a preset rule, to be switched to a lossless traffic transmission mode or a lossy traffic transmission mode. In this way, it is determined that based on the foregoing PFC deadlock prevention rule, whether to switch to the queue 6 or the queue 3.

Optionally, step 1110 and step 1120 may be triggered because a network topology structure in the network changes, for example, because some network devices are added or some network devices are reduced. Step 1110 and step 1120 may alternatively be triggered after network topology establishment is completed and before the data flow is transmitted. This is not limited in this embodiment of this application.

Optionally, the method further includes: The first network device determines a quantity of times that the first port and the third port are ports associated in a PFC deadlock within a preset time period. Step 1120 includes: When the quantity of times is greater than a preset threshold, the first network device determines to generate the PFC deadlock prevention rule.

In this embodiment of this application, an upstream port for which a PFC deadlock prevention rule is generated is determined based on the quantity of times, and a PFC deadlock prevention rule does not need to be generated for each group of upstream ports. This reduces a quantity of PFC deadlock prevention rules generated by the network device, and reduces storage space occupied by the PFC deadlock prevention rules.

Optionally, the method further includes: The first network device receives, through the first port, indication information sent by the second network device, where the indication information is used to indicate that buffer usage corresponding to a third sending queue in the second network device exceeds a threshold, ingress traffic of the third sending queue is 0, and a priority of a data flow buffered in the third sending queue is the same as a priority of the first data flow. The first network device determines the quantity of times based on the indication information.

It should be noted that, there are many manners of determining the quantity of times based on the indication information. For example, the indication information may indicate a total quantity of times that the usage of the third sending queue exceeds the threshold and the ingress traffic is 0 within the preset time period. Alternatively, the second network device may send the indication information to the first network device each time when the usage of the third sending queue exceeds the threshold and the ingress traffic is 0, and the first network device collects statistics on a total quantity of times that the usage of the third sending queue exceeds the threshold and the ingress traffic is 0 within a preset time period.

For example, a control plane of the first network device may maintain a linked list. An entry is <first port, third port, priority 1, Z>, indicating that within a preset time period, the first port is used as an ingress port, the third port is used as an egress port, and a quantity of times corresponding to the priority 1 is Z. When the quantity Z of times is greater than the preset threshold, the first network device is the first port, and the third port generates a PFC deadlock prevention rule.

In another example, a control plane of the first network device may maintain a linked list. An entry is <first port, third port, priority 1, Z'>, indicating that within a preset time period, the first port is used as an ingress port, the third port is used as an egress port, and a quantity of times corresponding to the priority 1 is Z'. Z' is a preconfigured initial quantity of times, and is greater than 0. Each time the indication information is received, Z' decreases by a preset quantity of times (for example, 1). When the quantity Z' of times is 0, the first network device generates a PFC deadlock prevention rule for the first port and the third port.

Optionally, the indication information may indicate, by carrying the priority of the data flow buffered in the third sending queue, that the buffer usage corresponding to the third sending queue in the second network device exceeds the threshold, and that the ingress traffic of the third sending queue is 0.

Optionally, the indication information may be carried in a PDU, and the priority of the data flow may be carried by using an optional TLV in the PDU, or by using a newly added TLV. For a specific encapsulation manner, refer to the foregoing description about the PDU encapsulation manner. For brevity, details are not described herein again.

The foregoing describes the method in the embodiments of this application in detail above with reference to FIG. 1 to FIG. 11. The following describes apparatuses for determining a port orientation of a port in the embodiments of this application in detail with reference to FIG. 12 to FIG. 14. It should be noted that, the apparatus shown in FIG. 12 to FIG.

14 may implement the steps in the foregoing methods. For brevity, details are not described herein again.

Figure 12:
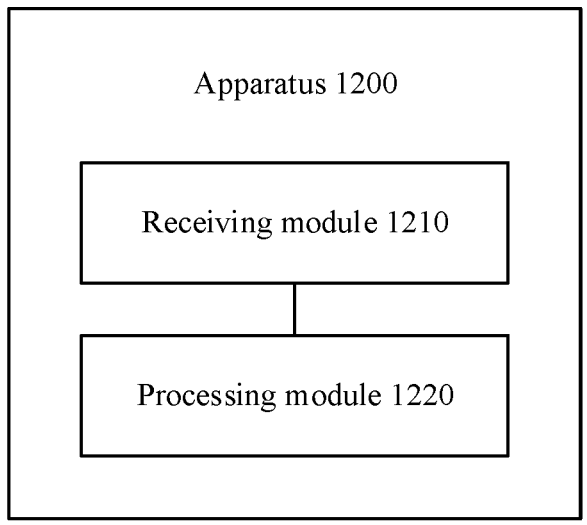
FIG. 12 is a schematic block diagram of an apparatus for determining a port orientation of a port according to an embodiment of this application.

FIG. 12 is a schematic block diagram of an apparatus for determining a port orientation of a port according to an embodiment of this application. An apparatus 1200 shown in FIG. 12 may be, for example, the foregoing first network device, and specifically includes a receiving module 1210 and a processing module 1220. Optionally, the receiving module 1210 is configured to perform step 210, and the processing module 1220 is configured to perform step 220. Optionally, the processing module 1220 is further configured to perform step 1110 and step 1120.

To be specific, the receiving module 1210 is configured to receive, through a first port, a protocol data unit PDU sent by a second network device.

The processing module 1220 is configured to determine, based on the PDU received by the receiving module, that the first port is an upstream port or a downstream port.

Optionally, in an embodiment, the PDU carries a topology level of the second network device in a network; and/or the PDU carries a port orientation of a second port used by the second network device to send the PDU, where the port orientation of the second port includes that the second port is an upstream port or the second port is a downstream port.

Optionally, in an embodiment, the processing module is specifically configured to determine a topology level of the first network device in the network based on the PDU, and determine, based on the topology level of the first network device, that the first port is the upstream port or the downstream port.

Optionally, in an embodiment, the network includes a plurality of network devices, and the plurality of network devices include the second network device. The receiving module is further configured to receive, through a plurality of ports, a plurality of PDUs sent by the plurality of network devices, where the plurality of ports include the first port, and the plurality of PDUs include the PDU sent by the second network device. The processing module is further configured to: determine topology levels of the plurality of network devices in the network based on the plurality of PDUs; select a target topology level from the topology levels of the plurality of network devices; and determine the topology level of the first network device based on the target topology level and a preset rule.

Optionally, in an embodiment, the processing module is specifically configured to determine, based on the topology level of the first network device and the topology level of the second network device, that the first port is the upstream port or the downstream port.

Optionally, in an embodiment, the processing module is specifically configured to determine the topology level of the second network device based on the PDU, and determine, based on the topology level of the second network device, that the first port is the upstream port or the downstream port.

Optionally, in an embodiment, the second network device is a root node in the network. The receiving module is further configured to receive, through the first port, the PDU sent by the second network device, where the topology level of the second network device carried in the PDU is a preset value. The processing module is further configured to determine, based on the preset value, that the first port is the upstream port.

Optionally, in an embodiment, the processing module is further configured to determine a topology level of the first network device based on the preset value. In the network, a layer represented by the topology level of the first network device is adjacent to a layer at which the root node is located.

Optionally, in an embodiment, the processing module is further configured to: determine, based on the PDU, that the second network device is a server, where the PDU carries a first TLV, and the first TLV indicates that the second network device is the server; and determine that the first port is the downstream port.

Optionally, in an embodiment, the PDU is an LLDP PDU.

Optionally, in an embodiment, the processing module is further configured to determine, based on a port ID subtype in the LLDP PDU, that the second network device is the server, and determine that the first port is the downstream port.

Optionally, in an embodiment, the processing module is further configured to determine a topology level of the first network device based on the subtype of the port ID in the LLDP PDU. In the network, a layer represented by the topology level of the first network device is adjacent to a layer at which the server is located.

Optionally, in an embodiment, the apparatus further includes a sending module. The sending module is configured to send an LLDP request to the second network device, where the LLDP request is used to request the port orientation of the second port of the second network device and/or the topology level of the second network device in the network.

Optionally, in an embodiment, if a port orientation of the first port is unknown, the sending module is further configured to send the LLDP request to the second network device.

Optionally, in an embodiment, the LLDP PDU includes a second TLV, where the second TLV is used to indicate the topology level of the second network device; and/or the LLDP PDU includes a third TLV, where the third TLV is used to indicate the port orientation of the second port.

Optionally, in an embodiment, the second TLV or the third TLV occupies a reserved bit in the LLDP PDU.

Optionally, in an embodiment, the apparatus further includes a plurality of sending queues, the plurality of sending queues include a first sending queue and a second sending queue, and the first sending queue is an original sending queue corresponding to a first data flow. The processing module is further configured to: determine that the first port and a third port of the first network device are upstream ports; and generate a priority flow control PFC deadlock prevention rule, where the PFC deadlock prevention rule is used to indicate to buffer the first data flow to the second sending queue, an ingress port of the first data flow is the first port, and an egress port of the first data flow is the third port.

Optionally, in an embodiment, the processing module is further configured to: determine a quantity of times that the first port and the third port are ports associated in a PFC deadlock within a preset time period; and when the quantity of times is greater than a preset threshold, determine to generate the PFC deadlock prevention rule.

Optionally, in an embodiment, the sending module is further configured to receive, through the first port, indication information sent by the second network device, where the indication information is used to indicate that buffer usage corresponding to a third sending queue in the second network device exceeds a threshold, ingress traffic of the third sending queue is 0, and a priority of a data flow buffered in the third sending queue is the same as a priority of the first data flow. The processing module is configured to determine the quantity of times based on the indication information.

Figure 13:
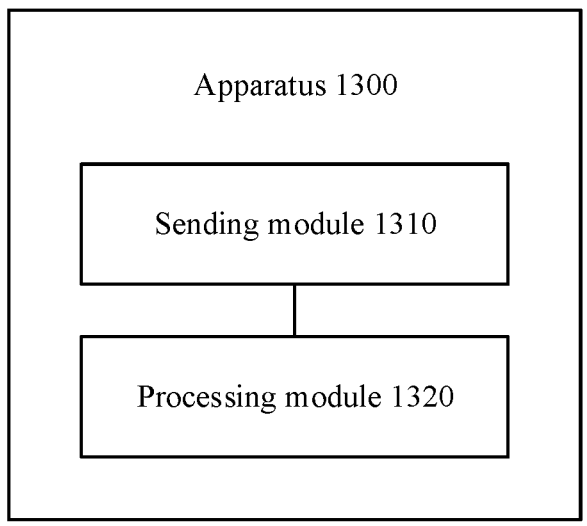
FIG. 13 is a schematic block diagram of an apparatus for determining a port orientation according to another embodiment of this application.

FIG. 13 is a schematic block diagram of an apparatus for determining a port orientation according to another embodiment of this application. An apparatus 1300 shown in FIG. 13 may be, for example, the foregoing second network device, and may specifically include a processing module 1310 and a sending module 1320. Optionally, the processing module 1310 is configured to perform step 200, and the sending module 1320 is configured to perform the function implemented by the second network device in step 210.

To be specific, the processing module 1310 is configured to generate a protocol data unit PDU, where the PDU is used to determine that a first port of a first network device is an upstream port or a downstream port.

The sending module 1320 is configured to send, to the first network device through a second port, the PDU generated by the processing module.

Optionally, in an embodiment, the PDU carries a topology level of the second network device in a network; and/or the PDU carries a port orientation of a second port used by the second network device to send the PDU, where the port orientation of the second port includes that the second port is an upstream port or the second port is a downstream port.

Optionally, in an embodiment, the second network device is a root node in the network, and the topology level of the second network device carried in the PDU is a preset value.

Optionally, in an embodiment, the second network device is a server, the PDU carries a first TLV, and the first TLV indicates that the second network device is the server.

Optionally, in an embodiment, the PDU is an LLDP PDU.

Optionally, in an embodiment, the apparatus further includes a receiving module. The receiving module is configured to receive an LLDP request sent by the first network device, where the LLDP request is used to request the port orientation of the second port and/or the topology level of the second network device.

Optionally, in an embodiment, the LLDP PDU includes a second TLV, where the second TLV is used to indicate the topology level of the second network device; and/or the LLDP PDU includes a third TLV, where the third TLV is used to indicate the port orientation of the second port.

Optionally, in an embodiment, the second TLV or the third TLV occupies a reserved bit in the LLDP PDU.

Optionally, in an embodiment, the sending module is further configured to send indication information to the first network device, where the indication information is used to indicate that buffer usage corresponding to a third sending queue in the apparatus exceeds a threshold, ingress traffic of the third sending queue is 0, and a priority of a data flow buffered in the third sending queue is the same as a priority of the first data flow.

Figure 14:
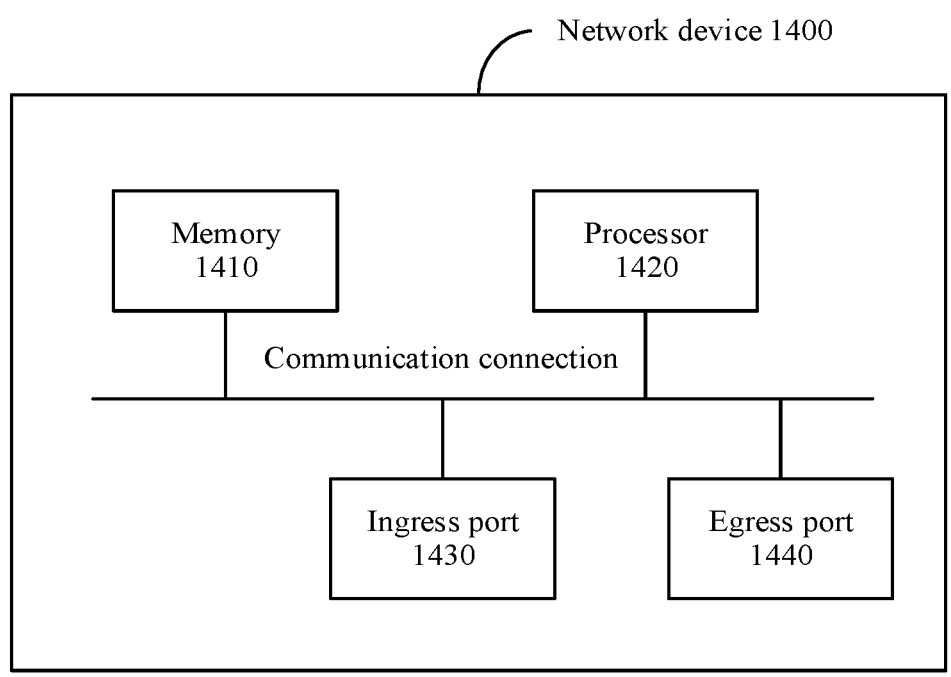
FIG. 14 is a schematic block diagram of a network device according to another embodiment of this application.

In an optional embodiment, the receiving module 1210 may be an ingress port 1430, the processing module 1220 may be a processor 1420, and the apparatus 1200 may further include a memory 1410 and an egress port 1440, as specifically shown in FIG. 14.

In an optional embodiment, the sending module 1310 may be an egress port 1440, the processing module 1320 may be a processor 1420, and the apparatus 1300 may further include a memory 1410 and an ingress port 1430, as specifically shown in FIG. 14.

FIG. 14 is a schematic block diagram of a network device according to another embodiment of this application. A network device 1400 shown in FIG. 14 may include a memory 1410, a processor 1420, an ingress port 1430, and an egress port 1440. The memory 1410, the processor 1420, the ingress port 1430, and the egress port 1440 are connected through an internal connection path. The memory 1410 is configured to store instructions, and the processor 1420 is configured to execute the instructions stored in the memory 1420, to control the ingress port 1430 to receive an input PDU or data flow, and control the egress port 1440 to forward a to-be-sent PDU or data flow.

It should be noted that, the ingress port 1430 may be one of a plurality of ports included in the network device. The egress port 1440 may be one of the plurality of ports included in the network device. The ingress port 1430 and the egress port 1440 may be understood as two logical ports, in other words, may respectively correspond to two physical ports, or may correspond to one physical port. This is not limited in this application.

In an implementation process, the steps in the foregoing method can be implemented by using an integrated logic circuit of hardware in the processor 1420, or by using instructions in a form of software. The methods disclosed with reference to the embodiments of this application may be directly performed by a hardware processor, or may be performed by using a combination of hardware in the processor and a software module. The software module may be located in a mature storage medium in the field, such as a random access memory, a flash memory, a read-only memory, a programmable read-only memory, an electrically erasable programmable memory, or a register. The storage medium is located in the memory 1410, and the processor 1420 reads information in the memory 1410 and completes the steps in the foregoing methods in combination with hardware of the processor. Details are not described again herein to avoid repetition.

It should be understood that, in this embodiment of this application, the processor may be a central processing unit (central processing unit, CPU), another general purpose processor, a digital signal processor (digital signal processor, DSP), an application-specific integrated circuit (application-specific integrated circuit, ASIC), a field programmable gate array (field programmable gate array, FPGA), another programmable logic device, a discrete gate, a transistor logic device, a discrete hardware component, or the like. The general-purpose processor may be a microprocessor, or the processor may be any conventional processor or the like.

It should be further understood that, in the embodiments of this application, the memory may include a read-only memory and a random access memory, and provide instructions and data for the processor. A part of the processor may further include a non-volatile random access memory.

For example, the processor may further store information of a device type.

It should be understood that in the embodiments of this application, "B corresponding to A" indicates that B is associated with A, and B may be determined according to A. However, it should be further understood that determining B based on A does not mean that B is determined based on only A. B may alternatively be determined based on A and/or other information.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with units and algorithm steps in the examples described in the embodiments disclosed in this specification, the embodiments may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected depending on actual requirements to achieve the objectives of the solutions in the embodiments.

In addition, function units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes various media that can store program code, for example, a USB flash drive, a removable hard disk, a read-only memory (Read-Only Memory, ROM), a random access memory (Random Access Memory, RAM), a magnetic disk, and an optical disc.

The foregoing descriptions are merely specific implementations in this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for determining a port orientation, the method comprising:
   receiving, by a first network device through a first port, a protocol data unit (PDU) sent by a second network device, wherein the PDU carries a topology level of the second network device in a network; and
   determining, by the first network device based on the PDU, that the first port is an upstream port or a downstream port.

2. The method according to claim 1, wherein
   the PDU further carries a port orientation of a second port used by the second network device to send the PDU, wherein the port orientation of the second port indicates that the second port is an upstream port or a downstream port.

3. The method according to claim 1, wherein the determining, by the first network device based on the PDU, that the first port is the upstream port or the downstream port comprises:
   determining, by the first network device, a topology level of the first network device in the network based on the PDU; and
   determining, by the first network device based on the topology level of the first network device, that the first port is the upstream port or the downstream port.

4. The method according to claim 3, wherein:
   the network comprises a plurality of network devices, the plurality of network devices including the second network device, wherein:
   the receiving, by a first network device through a first port, a protocol data unit PDU sent by the second network device comprises:
      receiving, by the first network device through a plurality of ports, a plurality of PDUs sent by the plurality of network devices, wherein the plurality of ports comprises the first port, and the plurality of PDUs comprises the PDU sent by the second network device; and
   the determining, by the first network device, a topology level of the first network device in the network based on the PDU comprises:
      determining, by the first network device, topology levels of the plurality of network devices in the network based on the plurality of PDUs;
      selecting, by the first network device, a target topology level from the topology levels of the plurality of network devices; and
      determining, by the first network device, the topology level of the first network device based on the target topology level and a preset rule.

5. The method according to claim 3, wherein the determining, by the first network device based on the topology level of the first network device, that the first port is the upstream port or the downstream port comprises:
   determining, by the first network device based on the topology level of the first network device and the topology level of the second network device, that the first port is the upstream port or the downstream port.

6. The method according to claim 2, wherein the determining, by the first network device based on the PDU, that the first port is an upstream port or a downstream port comprises:
determining, by the first network device, the topology level of the second network device based on the PDU; and
determining, by the first network device based on the topology level of the second network device, that the first port is the upstream port or the downstream port.

7. The method according to claim 6, wherein the second network device is a root node in the network, the PDU carries a topology level of the second network device in the network, and the receiving, by a first network device through a first port, a PDU sent by a second network device comprises:
receiving, by the first network device through the first port, the PDU sent by the second network device, wherein the topology level of the second network device carried in the PDU is a preset value; and
the determining, by the first network device based on the topology level of the second network device, that the first port is the upstream port or the downstream port comprises:
determining, by the first network device based on the preset value, that the first port is the upstream port.

8. The method according to claim 1, wherein the determining, by the first network device based on the PDU, that the first port is an upstream port or a downstream port comprises:
determining, by the first network device based on the PDU, that the second network device is a server, wherein the PDU carries a first type-length-value (TLV), and the first TLV indicates that the second network device is the server; and
determining, by the first network device, that the first port is the downstream port.

9. The method according to claim 1, wherein the PDU is a link layer discovery protocol (LLDP) PDU.

10. The method according to claim 9, wherein before the first network device receives the PDU sent by the second network device, the method further comprises:
sending, by the first network device, an LLDP request to the second network device to request the port orientation of the second port of the second network device or the topology level of the second network device in a network.

11. The method according to claim 10, wherein a port orientation of the first port is unknown prior to the sending, by the first network device, the LLDP request to the second network device.

12. The method according to claim 1, wherein the first network device comprises a plurality of sending queues, the plurality of sending queues comprising a first sending queue and a second sending queue, the first sending queue being an original sending queue corresponding to a first data flow; the method further comprising:
determining, by the first network device, that the first port and a third port of the first network device are upstream ports; and
generating, by the first network device, a priority flow control (PFC) deadlock prevention rule to indicate to buffer the first data flow to the second sending queue, an ingress port of the first data flow is the first port, and an egress port of the first data flow is the third port.

13. A first network device, comprising:
one or more processors; and
a non-transitory computer-readable memory storing a program to be executed by the one or more processors, the program including instructions that, when executed by the one or more processors, cause the first network device to:
receive, through a first port, a protocol data unit (PDU) sent by a second network device, wherein the PDU carries a topology level of the second network device in a network; and
determine, based on the PDU received by the receiving module, that the first port is an upstream port or a downstream port.

14. The first network device according to claim 13, wherein
the PDU further carries a port orientation of a second port used by the second network device to send the PDU, wherein the port orientation of the second port indicates that the second port is the upstream port or the second port is the downstream port.

15. The first network device according to claim 13, wherein the program further comprises instructions that, when executed by the one or more processors, cause the first network device to:
determine a topology level of the first network device in a network based on the PDU; and
determine, based on the topology level of the first network device, that the first port is the upstream port or the downstream port.

16. The first network device according to claim 15, wherein the network comprises a plurality of network devices, the plurality of network devices including the second network device, the program further comprising instructions that, when executed by the one or more processors, cause the first network device to:
receive, through a plurality of ports, a plurality of PDUs sent by the plurality of network devices, the plurality of ports comprising the first port, and the plurality of PDUs comprising the PDU sent by the second network device;
determine topology levels of the plurality of network devices in the network based on the plurality of PDUs;
select a target topology level from the topology levels of the plurality of network devices; and
determine the topology level of the first network device based on the target topology level and a preset rule.

17. The first network device according to claim 15, wherein the program further comprises instructions that, when executed by the one or more processors, cause the first network device to:
determine, based on the topology level of the first network device and the topology level of the second network device, that the first port is the upstream port or the downstream port.

18. The first network device according to claim 14, wherein the program further comprises instructions that, when executed by the one or more processors, cause the first network device to:
determine the topology level of the second network device based on the PDU; and
determine, based on the topology level of the second network device, that the first port is the upstream port or the downstream port.

19. The first network device according to claim 18, wherein the second network device is a root node in the network, the PDU carries a topology level of the second network device in the network, and the program further comprises instructions that, when executed by the one or more processors, cause the first network device to:
- receive, through the first port, the PDU sent by the second network device, wherein the topology level of the second network device carried in the PDU is a preset value; and
- determine, based on the preset value, that the first port is the upstream port.

20. The first network device according to claim 13, wherein the program further comprises instructions that, when executed by the one or more processors, cause the first network device to:
- determine, based on the PDU, that the second network device is a server, wherein the PDU carries a first type-length-value TLV, and the first TLV indicates that the second network device is the server; and
- determine that the first port is the downstream port.

* * * * *